(12) United States Patent
Zhang et al.

(10) Patent No.: US 11,765,776 B2
(45) Date of Patent: *Sep. 19, 2023

(54) FEEDBACK FOR MESSAGE B OF A TWO-STEP RANDOM ACCESS CHANNEL PROCEDURE

(71) Applicant: QUALCOMM Incorporated, San Diego, CA (US)

(72) Inventors: Xiaoxia Zhang, San Diego, CA (US); Sony Akkarakaran, Poway, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,672

(22) Filed: May 2, 2022

(65) Prior Publication Data

US 2022/0295566 A1 Sep. 15, 2022

Related U.S. Application Data

(63) Continuation of application No. 16/736,782, filed on Jan. 7, 2020, now Pat. No. 11,337,253.
(Continued)

(51) Int. Cl.
*H04W 72/00* (2023.01)
*H04W 74/08* (2009.01)
(Continued)

(52) U.S. Cl.
CPC ....... *H04W 74/0833* (2013.01); *H04L 1/1812* (2013.01); *H04L 5/0055* (2013.01); *H04W 72/23* (2023.01); *H04W 74/004* (2013.01)

(58) Field of Classification Search
CPC .......... H04W 74/0833; H04W 72/042; H04W 72/14; H04W 74/004; H04W 72/1263;
(Continued)

(56) References Cited

U.S. PATENT DOCUMENTS 10,681,648 B2 6/2020 Jeon et al.
11,337,253 B2 5/2022 Zhang
(Continued)

FOREIGN PATENT DOCUMENTS

CN 104468030 B 6/2018

OTHER PUBLICATIONS

Fujitsu: "TAT Expiry During RA Procedure," 3GPP Draft, 3GPP TSG RAN WG2 Meeting #63, R2-084479, TAT Expiry During RA Procedure, 3rd Generation Partnership Project (3GPP), Mobile Competence Centre, 650, Route Des Lucioles, F-06921, Sophia-Antipolis Cedex, France, No. Jeju, Aug. 18, 2008-Aug. 22, 2008, Aug. 12, 2008 (Aug. 12, 2008), XP050319530, 4 pages, [retrieved on Aug. 12, 2008], p. 2, lines 8,11.
(Continued)

*Primary Examiner* — Lan-Huong Truong
(74) *Attorney, Agent, or Firm* — Holland & Hart LLP

(57) ABSTRACT

Methods, systems, and devices for wireless communications are described. A user equipment (UE) may use information received as part of a two-step random access channel (RACH) procedure to indicate that the two-step RACH procedure has been completed. For example, a UE may perform a two-step RACH procedure that includes the UE transmitting a first message to a base station and, in response, receiving a second message from a base station. The second message may include feedback information the UE uses to signal that the RACH procedure has been completed. In some examples, the feedback information may indicate a physical channel or grant, or both, and a third
(Continued)

message may be transmitted by the UE based on the feedback information included in the second message. As such, the third message may serve as an indication that the second message was received, and the UE completed the RACH procedure.

20 Claims, 18 Drawing Sheets

Related U.S. Application Data

(60) Provisional application No. 62/791,628, filed on Jan. 11, 2019.

(51) Int. Cl.
*H04W 74/00* (2009.01)
*H04L 5/00* (2006.01)
*H04L 1/1812* (2023.01)
*H04W 72/23* (2023.01)

(58) Field of Classification Search
CPC .. H04W 74/002; H04L 1/1812; H04L 5/0055; H04L 1/0026; H04L 1/1854; H04L 1/1861
See application file for complete search history.

(56) References Cited

U.S. PATENT DOCUMENTS

| | | |
|---|---|---|
| 2014/0133447 A1 | 5/2014 | Moulsley et al. |
| 2014/0221030 A1 | 8/2014 | Fujii et al. |
| 2018/0110074 A1 | 4/2018 | Akkarakaran et al. |
| 2018/0124822 A1 | 5/2018 | Wang et al. |
| 2018/0176847 A1 | 6/2018 | Fasil Abdul et al. |
| 2018/0205516 A1 | 7/2018 | Jung et al. |
| 2018/0279186 A1 | 9/2018 | Park et al. |
| 2018/0368138 A1 | 12/2018 | Jung et al. |
| 2020/0107371 A1 | 4/2020 | Kunt et al. |
| 2020/0107372 A1 | 4/2020 | Agiwal et al. |

OTHER PUBLICATIONS

International Preliminary Report on Patentability—PCT/US2020/012683, The International Bureau of WIPO—Geneva, Switzerland, dated Jul. 22, 2021.

International Search Report and Written Opinion—PCT/US2020/012683—ISA/EPO—dated Mar. 27, 2020.

Mediatek Inc: "2-step RACH MsgB Addressing and HARQ", 3GPP Draft, 3GPP TSG-RAN WG2 Meeting #104, 2-Step RACH Msgb Addressing and HARQ, 3rd Generation Partnership Project (3GPP), Mobile Competence Centre, 650, Route Des Lucioles, F-06921, Sophia-Antipolis Cedex, France, vol. RAN WG2, No. Spokane, US, Nov. 12, 2018-Nov. 16, 2018, Nov. 12, 2018 (Nov. 12, 2018), XP051556256, 5 pages, Retrieved from the Internet: URL: http://www.3gpp.org/ftp/Meetings%5F3GPP%5FSYNC/RAN2/Docs/R2%2D1816687%2Ezip, [retrieved on Nov. 12, 2018], figure 4, section 2.2, p. 4.

Sharenote: "Rach," Dec. 4, 2015 (Dec. 4, 2015), XP055562615, pp. 1-27, Retrieved from the Internet: URL: https://web.archive.org/web/20151204185806/http://www.sharetechnote.com/html/RACH_LTE.html, [retrieved on Feb. 27, 2019] p. 13.

Vivo: "RAN2 Impacts of 2-Step RACH", 3GPP Draft, 3GPP TSG-RAN WG2 Meeting #103bis, R2-1814263, RAN2 Impacts of 2-step RACH, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 12, 2018, Sep. 28, 2018 (Sep. 28, 2018), XP051523715, 3 pages, Retrieved from the Internet: URL: http://www.3gpp.org/ftp/tsg%5Fran/WG2%5FRL2/TSGR2%5F103bis/Docs/R2%2D1814263%2Ezip , [retrieved on Sep. 28, 2018], figure 1, p. 2, lines 22-43.

ZTE Corporation., et al., "Msg2 Payload Contents for 2-Step RACH", 3GPP Draft, 3GPP TSG-RAN WG2 Meeting#103-bis, R2-1814034, Msg2 Payload Contents for 2-step RACH, 3rd Generation Partnership Project (3GPP), Mobile Competence Centre, 650, Route Des Lucioles, F-06921 Sophia-Anti Polls Cedex, France, vol. RAN WG2, No. Chengdu. China, Oct. 8, 2018-Oct. 12, 2018, Sep. 27, 2018 (Sep. 27, 2018), XP051523495, 9 Pages, Retrieved from the Internet: URL:http://www.3gpp.org/ftp/tsg%5Fran/WG2%5FRL2/TSGR2%5F103bis/Docs/R2%2D1814034%2Ezip [retrieved on Sep. 27, 2018], p. 1, lines 21-23.

ZTE, et al., "Consideration on DL Data Transmission in RRC_INACTIVE State", 3GPP Draft, 3GPP TSG-RAN WG2 #97, R2-1701929, Consideration on DL Data Transmission in RRC_INACTIVE, 3rd Generation Partnership Project (3GPP), Mobile Competence Centre, 650, Route Des Lucioles, F-06921 Sophia-Antipolis Cedex, France, vol. RAN WG2, No. Athens, Greece; Feb. 13, 2017-Feb. 17, 2017, Feb. 12, 2017 (Feb. 12, 2017), XP051212463, 4 pages, Retrieved from the Internet: URL: http://www.3gpp.org/ftp/Meetings_3GPP_SYNC/RAN2/Docs [retrieved on Feb. 4, 2017], p. 3.

Mediatek Inc: "2-Step RACHmsgB Addressing and HARQ", 3GPP TSG-RAN WG2 Meeting #104, R2-1816687, Spokane, US, Nov. 12-16, 2018, 5 Pages, Part 2.1.

Taiwan Search Report—TW109100715—TIPO—dated Jan. 29, 2023.

FEEDBACK FOR MESSAGE B OF A TWO-STEP RANDOM ACCESS CHANNEL PROCEDURE

CROSS REFERENCE

The present Application for Patent is a Continuation of U.S. patent application Ser. No. 16/736,782 by Zhang et al., entitled "FEEDBACK FOR MESSAGE B OF A TWO-STEP RANDOM ACCESS CHANNEL PROCEDURE" filed Jan. 7, 2020, which claims the benefit of U.S. Provisional Patent Application No. 62/791,628 by Zhang et al., entitled "FEEDBACK FOR MESSAGE B OF A TWO-STEP RANDOM ACCESS CHANNEL PROCEDURE," filed Jan. 11, 2019, assigned to the assignee hereof, and expressly incorporated by reference herein.

BACKGROUND

The following relates generally to wireless communications, and more specifically to feedback for message B of a two-step random access channel (RACH) procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may support random access procedures for establishing communications between a UE and a base station. The random access procedure may involve a series of handshake messages between the UE and the base station. In some cases, the base station may be unable to determine whether the random access procedure is complete, which may result in relatively inefficient communications.

SUMMARY

The described techniques relate to improved methods, systems, devices, or apparatuses that support feedback for a two-step random access channel (RACH) procedure. Generally, the described techniques provide for signaling of information that a user equipment (UE) may use to indicate, to a base station, that a two-step RACH procedure has been completed following receipt of message B of the RACH procedure. For example, a UE may perform a two-step RACH procedure that includes the exchange of two messages between the UE and the base station. In such cases, the UE may transmit a first message (e.g., message A) that includes, for example, a random access preamble and a payload (e.g., including a scheduling request). In response, the base station may transmit a second message (e.g., message B) that includes at least feedback information that the UE may use to signal that the RACH procedure has been completed. In some cases, because the base station may not be aware of whether the second message was received (and successfully decoded) by the UE, the UE may use the feedback information included in the second message to transmit a third message to the base station. The third message may accordingly serve as an indication that the second message was received and that the RACH procedure was completed by the UE.

In some examples, the feedback information may include information for a physical uplink control channel (PUCCH), an uplink grant, a downlink grant, or a combination thereof. As such, the third message may be transmitted, for example, based on the PUCCH information received via the second message, or the third message may be a transmission of uplink data, such as when the feedback information includes an uplink grant. In other examples, the third message may include an acknowledgment (ACK) or negative acknowledgment (NACK) of downlink data received from the base station based on the downlink grant in the feedback information, where the ACK/NACK may also serve as confirmation that two-step RACH procedure was completed. The base station may determine whether the two-step RACH procedure was successfully completed based on the receipt of the third message.

A method of wireless communication at a UE is described. The method may include transmitting, to a base station, a first message of a two-step RACH procedure, the two-step RACH procedure including the first message and a second message, receiving, from the base station, the second message including feedback information for signaling that the two-step RACH procedure has been completed, and transmitting, to the base station, a third message including an indication of whether the second message was received by the UE, the third message transmitted in accordance with the feedback information.

An apparatus for wireless communication at a UE is described. The apparatus may include a processor, memory in electronic communication with the processor, and instructions stored in the memory. The instructions may be executable by the processor to cause the apparatus to transmit, to a base station, a first message of a two-step RACH procedure, the two-step RACH procedure including the first message and a second message, receive, from the base station, the second message including feedback information for signaling that the two-step RACH procedure has been completed, and transmit, to the base station, a third message including an indication of whether the second message was received by the UE, the third message transmitted in accordance with the feedback information.

Another apparatus for wireless communication at a UE is described. The apparatus may include means for transmitting, to a base station, a first message of a two-step RACH procedure, the two-step RACH procedure including the first message and a second message, receiving, from the base station, the second message including feedback information for signaling that the two-step RACH procedure has been completed, and transmitting, to the base station, a third message including an indication of whether the second message was received by the UE, the third message transmitted in accordance with the feedback information.

A non-transitory computer-readable medium storing code for wireless communication at a UE is described. The code may include instructions executable by a processor to transmit, to a base station, a first message of a two-step RACH procedure, the two-step RACH procedure including the first message and a second message, receive, from the base station, the second message including feedback information for signaling that the two-step RACH procedure has been completed, and transmit, to the base station, a third message including an indication of whether the second message was received by the UE, the third message transmitted in accordance with the feedback information.

Some examples of the method, apparatuses, and non-transitory computer-readable medium described herein may further include operations, features, means, or instructions for receiving, as part of the feedback information, information for a PUCCH, where transmitting the third message includes transmitting the third message on the PUCCH based at least in part on the information for the PUCCH.

In some examples of the method, apparatuses, and non-transitory computer-readable medium described herein, the information for the PUCCH includes a transmit power control (TPC) command.

In some examples of the method, apparatuses, and non-transitory computer-readable medium described herein, the information for the PUCCH includes at least one of a PUCCH resource indicator, a physical downlink shared channel (PDSCH)-to-hybrid automatic repeat request (HARD) timing indicator, listen-before-talk (LBT) information, a sounding reference signal (SRS) request, or a channel state information (CSI) request.

Some examples of the method, apparatuses, and non-transitory computer-readable medium described herein may further include operations, features, means, or instructions for transmitting, within the third message, a CSI report based on the channel state information request. In some examples of the method, apparatuses, and non-transitory computer-readable medium described herein, the second message includes a timing advance (TA) command, where the third message may be transmitted based on the TA command.

Some examples of the method, apparatuses, and non-transitory computer-readable medium described herein may further include operations, features, means, or instructions for receiving, as part of the feedback information, an uplink grant for transmitting uplink data to the base station, and transmitting, to the base station, the uplink data based on the uplink grant. Some examples of the method, apparatuses, and non-transitory computer-readable medium described herein may further include operations, features, means, or instructions for receiving, as part of the feedback information, a downlink grant for receiving downlink data from the base station, and receiving the downlink data based on the downlink grant.

In some examples of the method, apparatuses, and non-transitory computer-readable medium described herein, the feedback information includes at least one of an uplink grant or a downlink grant based on data to be communicated between the UE and the base station.

Some examples of the method, apparatuses, and non-transitory computer-readable medium described herein may further include operations, features, means, or instructions for transmitting, to a second base station, a fourth message of a second two-step RACH procedure, the second two-step RACH procedure including the fourth message and a fifth message, monitoring for the fifth message including feedback information for signaling that the second two-step RACH procedure may have been completed, determining that the second two-step RACH procedure may be unsuccessful based on monitoring for the fifth message, and refraining from transmitting a sixth message including an indication of whether the fifth message was received by the UE based on determining that the second two-step RACH procedure may be unsuccessful.

In some examples of the method, apparatuses, and non-transitory computer-readable medium described herein, monitoring for the fifth message may include operations, features, means, or instructions for receiving the fifth message, and failing to decode the fifth message.

In some examples of the method, apparatuses, and non-transitory computer-readable medium described herein, monitoring for the fifth message may include operations, features, means, or instructions for failing to receive the fifth message.

Some examples of the method, apparatuses, and non-transitory computer-readable medium described herein may further include operations, features, means, or instructions for receiving, as part of the feedback information, a downlink grant for receiving downlink data from the base station, and receiving the downlink data based on the downlink grant, where transmitting the third message includes transmitting the third message in response to the received downlink data, the third message including an indication of whether the downlink data was received.

Some examples of the method, apparatuses, and non-transitory computer-readable medium described herein may further include operations, features, means, or instructions for monitoring one or more downlink transmissions for the downlink data until the second message may be decoded. Some examples of the method, apparatuses, and non-transitory computer-readable medium described herein may further include operations, features, means, or instructions for determining a timing offset between the downlink grant and the downlink data, the timing offset including a timing gap value and a first slot offset value or including a second slot offset value that may be greater than the first slot offset value.

In some examples of the method, apparatuses, and non-transitory computer-readable medium described herein, the downlink grant includes at least one of LBT information or a CSI request. In some examples of the method, apparatuses, and non-transitory computer-readable medium described herein, the downlink data includes at least a radio resource control (RRC) configuration.

Some examples of the method, apparatuses, and non-transitory computer-readable medium described herein may further include operations, features, means, or instructions for transmitting an ACK or a NACK for the downlink data, where the ACK or the NACK include the signaling that the two-step RACH procedure may have been completed.

Some examples of the method, apparatuses, and non-transitory computer-readable medium described herein may further include operations, features, means, or instructions for receiving, as part of the feedback information, an uplink grant for transmitting uplink data to the base station.

Some examples of the method, apparatuses, and non-transitory computer-readable medium described herein may further include operations, features, means, or instructions for receiving, as part of the feedback information, an uplink grant for transmitting uplink data to the base station, where transmitting the third message includes transmitting the third message based at least in part on the uplink grant.

In some examples of the method, apparatuses, and non-transitory computer-readable medium described herein, the uplink grant includes listen-before-talk information including an indication of at least one of an LBT priority or a medium sensing category. Some examples of the method, apparatuses, and non-transitory computer-readable medium described herein may further include operations, features, means, or instructions for receiving, as part of the feedback information, a downlink grant for receiving downlink data from the base station.

In some examples of the method, apparatuses, and non-transitory computer-readable medium described herein, receiving the second message may include operations, features, means, or instructions for receiving the second message via a broadcast transmission from the base station or a unicast transmission from the base station.

In some examples of the method, apparatuses, and non-transitory computer-readable medium described herein, the feedback information may be different from feedback information associated with a physical downlink control channel (PDCCH).

A method of wireless communication at a base station is described. The method may include receiving, from a UE, a first message of a two-step RACH procedure, the two-step RACH procedure including the first message and a second message, transmitting, to the UE, the second message including feedback information, and determining whether a third message has been received from the UE in accordance with the feedback information, where the third message signals that the two-step RACH procedure has been completed.

An apparatus for wireless communication at a base station is described. The apparatus may include a processor, memory in electronic communication with the processor, and instructions stored in the memory. The instructions may be executable by the processor to cause the apparatus to receive, from a UE, a first message of a two-step RACH procedure, the two-step RACH procedure including the first message and a second message, transmit, to the UE, the second message including feedback information, and determine whether a third message has been received from the UE in accordance with the feedback information, where the third message signals that the two-step RACH procedure has been completed.

Another apparatus for wireless communication at a base station is described. The apparatus may include means for receiving, from a UE, a first message of a two-step RACH procedure, the two-step RACH procedure including the first message and a second message, transmitting, to the UE, the second message including feedback information, and determining whether a third message has been received from the UE in accordance with the feedback information, where the third message signals that the two-step RACH procedure has been completed.

A non-transitory computer-readable medium storing code for wireless communication at a base station is described. The code may include instructions executable by a processor to receive, from a UE, a first message of a two-step RACH procedure, the two-step RACH procedure including the first message and a second message, transmit, to the UE, the second message including feedback information, and determine whether a third message has been received from the UE in accordance with the feedback information, where the third message signals that the two-step RACH procedure has been completed.

Some examples of the method, apparatuses, and non-transitory computer-readable medium described herein may further include operations, features, means, or instructions for determining information for a PUCCH, transmitting, within the feedback information, the information for the PUCCH, and receiving the third message on the PUCCH based on the information for the PUCCH.

In some examples of the method, apparatuses, and non-transitory computer-readable medium described herein, the information for the PUCCH includes a TPC command. In some examples, the information for the PUCCH may include at least one of a PUCCH resource indicator, a PDSCH-to-HARQ timing indicator, LBT information, an SRS request, or a CSI request.

Some examples of the method, apparatuses, and non-transitory computer-readable medium described herein may further include operations, features, means, or instructions for identifying uplink data that the UE may be to communicate, transmitting an uplink grant for the uplink data as part of the feedback information, and receiving, from the UE, the uplink data based on the uplink grant.

Some examples of the method, apparatuses, and non-transitory computer-readable medium described herein may further include operations, features, means, or instructions for identifying downlink data for the UE, transmitting, as part of the feedback information, a downlink grant for receiving the downlink data, and transmitting, to the UE, the downlink data based on the downlink grant.

In some examples of the method, apparatuses, and non-transitory computer-readable medium described herein, the feedback information includes at least one of an uplink grant or a downlink grant based on data to be communicated between the UE and the base station.

Some examples of the method, apparatuses, and non-transitory computer-readable medium described herein may further include operations, features, means, or instructions for transmitting, as part of the feedback information, a downlink grant for transmitting downlink data to the UE, transmitting the downlink data based on the downlink grant, and receiving the third message in response to the received downlink data, the third message including an indication of whether the downlink data was received.

Some examples of the method, apparatuses, and non-transitory computer-readable medium described herein may further include operations, features, means, or instructions for transmitting an indication of a timing offset between the downlink grant and the downlink data, the timing offset including a timing gap value and a first slot offset value or including a second slot offset value that may be greater than the first slot offset value, where the indication of the timing offset may be transmitted via remaining minimum system information (RMSI).

In some examples of the method, apparatuses, and non-transitory computer-readable medium described herein, the downlink grant includes at least one of LBT information or a CSI. In some examples of the method, apparatuses, and non-transitory computer-readable medium described herein, the downlink data includes at least an RRC configuration.

Some examples of the method, apparatuses, and non-transitory computer-readable medium described herein may further include operations, features, means, or instructions for receiving an acknowledgment or a negative acknowledgment for the downlink data, and determining that the two-step RACH procedure may have been completed based on the ACK or the NACK.

Some examples of the method, apparatuses, and non-transitory computer-readable medium described herein may further include operations, features, means, or instructions for transmitting, as part of the feedback information, an uplink grant for receiving uplink data from the UE, and receiving the third message based on the uplink grant.

In some examples of the method, apparatuses, and non-transitory computer-readable medium described herein, the uplink grant includes LBT information including an indication of at least one of an LBT priority or a medium sensing category.

Some examples of the method, apparatuses, and non-transitory computer-readable medium described herein may further include operations, features, means, or instructions for determining that the third message may have not been received from the UE, and retransmitting the second message based on the determination that the third message may have not been received from the UE.

In some examples of the method, apparatuses, and non-transitory computer-readable medium described herein, transmitting the second message may include operations, features, means, or instructions for transmitting the second message via a broadcast transmission or a unicast transmission to the UE.

In some examples of the method, apparatuses, and non-transitory computer-readable medium described herein, the feedback information may be different from feedback information associated with a PDCCH.

DETAILED DESCRIPTION

Figure 1:
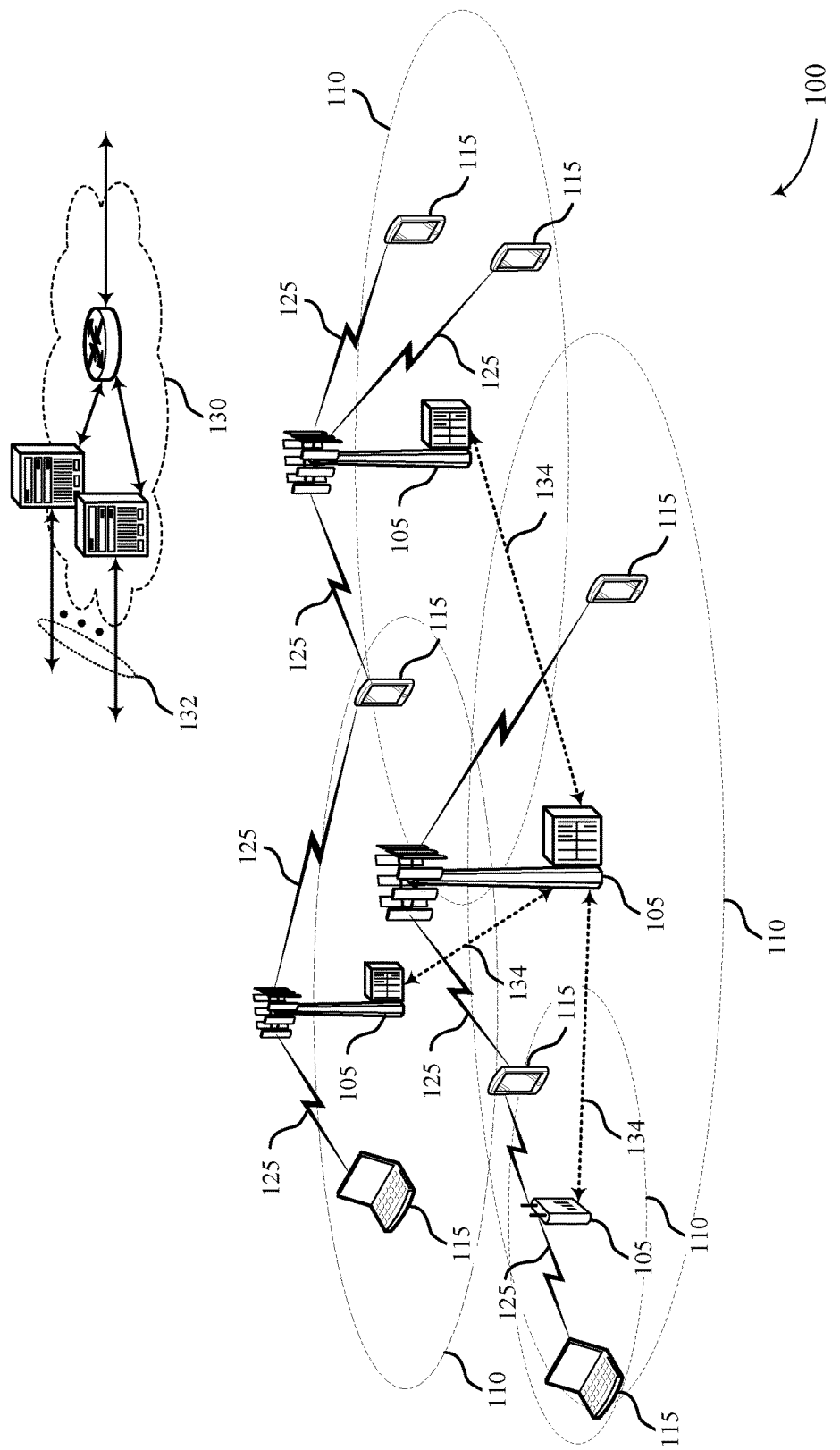
FIG. 1 illustrates an example of a system for wireless communications that supports feedback a two-step random access channel (RACH) procedure in accordance with aspects of the present disclosure.

In some wireless communication systems, a user equipment (UE) and a base station may establish communication using a random access channel (RACH) procedure. For instance, the random RACH procedure may include a series of handshake messages between the UE and the base station. In some examples, RACH procedures may be used when a UE has data to transmit, but does not have uplink resources assigned. In other examples, RACH procedures may be used when the UE is handed over from a source base station to a target base station. In any event, the RACH procedure may enable the UE to synchronize with the network and communicate with the base station.

In some cases, a UE and a base station may establish communication using a two-step RACH procedure, which may reduce latency associated with random access procedures utilizing a greater number of messages exchanged (e.g., four-step RACH procedures). For instance, two-step RACH procedures may minimize delays in establishing communications by reducing a number of messages exchanged between the UE and base station. In the two-step RACH procedure, a transmission of a first message (e.g., message A) sent by the UE may include a preamble portion (e.g., a RACH preamble) and a payload portion (e.g., a physical uplink shared channel (PUSCH) payload). Additionally, a transmission of a second message (e.g., message B) may include a payload including various information, such as a preamble response, contention resolution information, a radio resource control (RRC) connection setup information, or a combination thereof. The second message also may include timing advance (TA) information used by the UE to obtain transmission timing for communications with the base station.

However, after the transmission of the second message in the two-step RACH procedure, the base station may not be aware of whether the UE received the second message, or was able to successfully decode the second message. As a result, the UE may send feedback to the base station to indicate whether the two-step RACH procedure was completed (e.g., the second message was received, and the payload was decoded by the UE). As described herein, a UE may provide feedback to the base station for the second message of the two-step RACH procedure through the use of feedback information transmitted in the payload of the second message. For example, the second message of the two-step RACH procedure may include feedback information that conveys, to the UE, how the feedback may be transmitted, for example, by transmitting a third message from the UE to the base station. The base station may then determine whether the UE has successfully completed the RACH procedure based on receipt of the third message.

In some aspects, the feedback information within the second message may include physical uplink control channel (PUCCH) information that the UE uses to transmit feedback. For instance, the PUCCH information may include a transmit power control (TPC) command, a PUCCH resource indicator, a physical downlink shared channel (PDSCH)-to-hybrid automatic repeat request (HARQ) feedback timing indicator, listen-before-talk (LBT) priority information, or any combination thereof, among other information. The UE may use the PUCCH information to send the third message. Such techniques may reduce latency in providing feedback to the base station regarding the completion of the RACH procedure.

Additionally or alternatively, the feedback information within the second message may also include an uplink grant. As such, the UE may send uplink data to the base station based on the uplink grant, and the uplink transmission may serve as feedback for the two-step RACH procedure (e.g., because the UE sent the uplink data using the grant, the base station may determine that the RACH procedure was completed). Accordingly, the base station may receive the third message based on the uplink grant and determine that the RACH procedure was successfully completed. Such techniques may enable the UE to immediately transmit pending uplink data upon receipt of the second message.

In other examples, the feedback information within the second message may include a downlink grant. In such cases, the base station may subsequently transmit downlink data to the UE based on the downlink grant, and after the downlink data is received, the UE may provide feedback (e.g., HARQ acknowledgment (ACK)/negative acknowledgment (NACK)) for the downlink data. Such feedback may also serve as feedback for the second message, and may signal to the base station that the RACH procedure was successfully completed by the UE. In some cases, the second message may include various combinations of PUCCH information, uplink grants, and downlink grants.

Aspects of the disclosure are initially described in the context of a wireless communications system. Further examples are then provided with regard to process flows that illustrate various techniques for enabling efficient feedback schemes for RACH procedures. Aspects of the disclosure are further illustrated by and described with reference to apparatus diagrams, system diagrams, and flowcharts that relate to feedback for message B of a two-step RACH procedure.

FIG. 1 illustrates an example of a wireless communications system 100 that supports feedback for message B of a two-step RACH procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of feedback information signaled by a base station, a feedback message may be sent from a UE 115 to the base station 105 to indicate that a two-step RACH procedure has been completed.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal received at the UE 115 with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

PUCCH may be mapped to a control channel defined by a code and two consecutive resource blocks. Uplink control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized.

A physical downlink control channel (PDCCH) carries downlink control information (DCI) in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, a modulation and coding scheme (MCS). and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

A PDCCH may carry DCI messages associated with multiple users, and each UE 115 may decode the DCI messages (e.g., DCI messages that are intended for each UE 115, respectively). For example, each UE 115 may be assigned a C-RNTI and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using a C-RNTI of the UE 115, and perform a CRC check to determine whether the attempt was successful. In some cases, HARQ feedback may be transmitted in response to a received PDCCH.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical cell identification channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. The MIB may use the middle 6 RBs (72 subcarriers) in the frequency domain. The MIB carries a few important pieces of information for UE initial access, including, for example, downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may can try different phases of a scrambling code until the UE 115 gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and the SIB1 may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, the UE 115 may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary C-RNTI. The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH process by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may participate in a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid TA. For example, a UE 115 may use a valid TA to coordinate the timing of transmissions from the UE 115 to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure.

For example, a first RACH message (e.g., message A), sent from a UE 115 to a base station 105, may combine the contents of a RACH message 1 and message 3 from four-step RACH. Additionally, message A may consist of a RACH preamble and a physical uplink shared channel (PUSCH) carrying a payload with the contents of the message (e.g., equivalent to message 3), where the preamble and the payload may be transmitted on separate waveforms. In some cases, the base station 105 may transmit a downlink control channel (e.g., PDCCH) and a corresponding second RACH message (e.g., message B) to the UE 115, where message B may combine the equivalent contents of a RACH message 2 and message 4 from four-step RACH. In some examples of two-step RACH, a base station 105 may transmit message B using either broadcast methods (e.g., targeting multiple UEs 115) or unicast methods (e.g., targeting a specific UE 115).

In some cases, one or more advantages may be realized by the base station 105 determining that UE 115 has successfully received message B and completed the two-step RACH procedure, such as enhancements to communications efficiency and improvements to system latency. Therefore, base station 105 may include feedback transmission information in message B. UE 115 may receive message B and use the feedback transmission information in message B to provide feedback. The base station may determine from the provided feedback that the RACH procedure was successful.

Wireless communications system 100 may support feedback for a two-step RACH procedure. As such, a message of the two-step RACH procedure may include information that a UE 115 may use to indicate, to a base station 105, that a two-step RACH procedure has been completed. For example, a UE 115 may perform a two-step RACH procedure that includes the exchange of the two messages between the UE 115 and the base station 105. In such cases, the UE 115 may transmit a first message (e.g., message A, msgA, or some other like terminology) that includes, for example, a random access preamble and a payload (e.g., including a scheduling request). In response, the base station 105 may transmit the second message (e.g., message B, msgB, or some other like terminology) that includes at least feedback information that the UE 115 may use to signal that the two-step RACH procedure has been completed. In such cases, because the base station 105 may have any prior feedback as to whether the second message was received and decoded by the UE 115, the UE 115 may use the feedback information included in the second message to transmit a third message to the base station 105. The third message may accordingly serve as an indication that the second message was received and that the two-step RACH procedure was successfully completed by the UE 115.

In some examples, the feedback information may include information for PUCCH, an uplink grant, a downlink grant, or any combination thereof. As such, the third message may be transmitted, for example, based on the PUCCH information, or may include a transmission of uplink data based on the feedback information including the uplink grant. In other examples, the third message may include an ACK/NACK of downlink data received from the base station 105 based on the downlink grant included in the feedback information. Here, the ACK/NACK may also serve as confirmation that two-step RACH procedure was completed. The base station 105 may determine whether the two-step RACH procedure was successfully completed based on the receipt of the third message from the UE 115.

Figure 2:
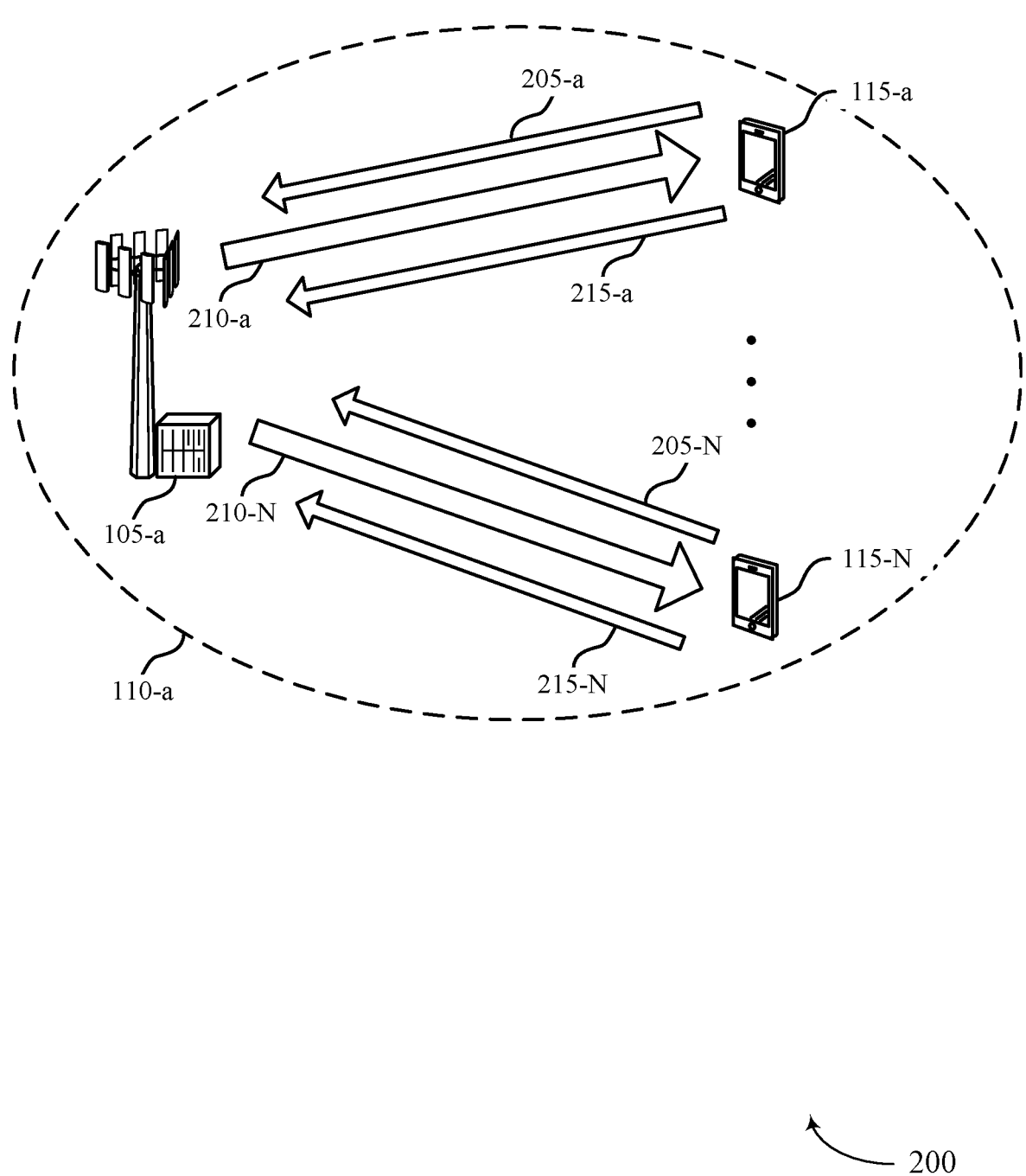
FIG. 2 illustrates an example of a wireless communications system that supports feedback for message B of a two-step RACH procedure in accordance with aspects of the present disclosure.

FIG. 2 illustrates an example of a wireless communications system 200 that supports feedback for message B of a two-step RACH procedure in accordance with aspects of the present disclosure. In some examples, wireless communications system 200 may implement aspects of wireless communications system 100.

As illustrated, wireless communications system 200 may include at least two UEs 115 and base station 105-*a*, which may be examples of a UE 115 and a base station 105, respectively, as described above with reference to FIG. 1. For example, wireless communications system 200 may include UE 115-*a* and UE 115-N (e.g., where UE 115-N may represent UE 115-*b*, UE 115-*c*, and so on). Alternatively, wireless communications system 200 may include a single UE (e.g., UE 115-*a*). Wireless communications system 200 may also include first messages 205 (e.g., message A) from one or more UEs 115, as well as second messages 210 (e.g., message B) from base station 105-*a* (e.g., as part of a two-step RACH procedure). For instance, UE 115-*a* may use first message 205-*a* to convey control and/or data information to base station 105-*a*. Further, base station 105-*a* may use second messages 210 (e.g., second message 210-*a* and/or second message 210-N) to convey control and/or data information to one or more UEs 115 (e.g., UE 115-*a* and/or UE 115-N). In some cases, wireless communications system 200 may also include feedback messages 215 (e.g., feedback message 215-*a* and feedback message 215-N). For example, UE 115-*a* may use feedback message 215-*a* to send a third message providing feedback (e.g., HARQ feedback) for second message 210-*a* to base station 105-*a*.

In some cases, each transmission in a two-step RACH procedure may include multiple waveforms that convey information between devices. For example, an uplink transmission from UE 115-*a* (e.g., first message 205-*a*) may include a preamble (e.g., a RACH preamble). The first message may also include a payload (e.g., a PUSCH payload). Additionally, a downlink transmission from base station 105-*a* (e.g., second message 210-*a*) may include various information conveyed to the one or more UE 115. For example, second message 210-*a* may include a preamble response portion, a contention resolution portion, an RRC connection setup message, or a combination thereof. The second message may also include other information provided by base station 105-*a* to the UEs 115, such as TA information.

In some cases, a second message 210 may be sent to a specific UE 115. That is, base station 105-*a* may send a second message 210 in a unicast fashion. For example, second message 210-*a* may be targeted to only UE 115-*a*. UE 115-*a* may provide feedback message 215-*a* (e.g., ACK/NACK to second message 210-*a*) to base station 105-*a*. For example, UE 115-*a* may send feedback message 215-*a* using PDCCH information (e.g., PDCCH information from a downlink control message over the PDCCH such as the second message 210-*a* or another message). Base station 105-*a* may receive feedback message 215-*a* and determine whether UE 115-*a* has successfully completed the RACH procedure.

Additionally or alternatively, second message 210 may be broadcast to one or more UEs. For example, second message 210-*a* may be the same as second message 210-N and may be transmitted to multiple UEs 115 (e.g., UE 115-*a* and UE 115-N) in wireless communications system 200. In some examples, PDCCH-based UE feedback may not be feasible. For example, UE 115-*a* may be unable to use PDCCH information included in second message 210-*a* to provide feedback (e.g., when multiple UEs 115 receive the same second message 210). Consequently, base station 105-*a* may be unable to receive feedback from each UE 115 for the second message 210. Thus, base station 105-*a* may be unable to determine whether a two-step RACH procedure was successful for UE 115-*a*.

As described herein, a UE 115 may provide feedback to base station 105-*a* for the second message (e.g., second message 210-*a*) of a two-step RACH procedure, where the feedback may be based on feedback information signaled within the second message 210. Specifically, second message 210-*a* may include feedback information that conveys, to UE 115-*a*, how a third message (e.g., feedback message 215-*a*) may be transmitted to signal completion of the RACH procedure. Upon receiving feedback message 215-*a*, base station 105-*a* may then determine whether UE 115-*a* has successfully completed the RACH procedure. Further, feedback message 215-*a* may comprise feedback that is not based on information received within a PDCCH (e.g., when UE 115-*a* is unable to use PDCCH information to provide feedback to base station 105-*a*, as described above). Such feedback schemes may reduce latency (e.g., by eliminating the time it may take for another RACH attempt) and may reduce the network load (e.g., due to fewer RACH attempts). The described techniques may be applied to systems utilizing broadcast transmissions, unicast transmissions, or both. Further, the described techniques may be applicable to systems using licensed spectrum, unlicensed spectrum, or a combination thereof.

In some cases, second message 210-*a* may provide, as part of the feedback information, PUCCH information to UE 115-*a*. The PUCCH information may include a transmit power control (TPC) command for a PUCCH. The TPC command may indicate to UE 115-*a* how much power to use for feedback transmission. As an illustrative example, the TPC command may be indicated via 2 bits of the PUCCH information. Additionally or alternatively, the PUCCH information may include a PUCCH resource indicator. The PUCCH resource indicator may indicate to UE 115-*a* which resource to utilize for feedback transmission. In an example, the PUCCH resource indicator may be an example of a PUCCH resource index and may be indicated via 4 bits of the PUCCH information. Additionally or alternatively, the PUCCH information may include a PDSCH-to-HARQ feedback timing indicator. The PDSCH-to-HARQ feedback timing indicator may indicate to UE 115-*a* the timing for feedback transmission. As an illustrative example, the PDSCH-to-HARQ feedback timing indicator may be indicated via 3 bits of the PUCCH information.

In some cases, UE 115-*a* may communicate using unlicensed operation and, in order to mitigate the likelihood of collisions on such a wireless channel, UE 115-*a* may follow an LBT procedure. The LBT procedure may involve UE 115-*a* determining whether a wireless channel is clear before transmitting. For example, UE 115-*a* may measure an energy level of the channel before starting a transmission.

Based on the measured energy level, UE 115-*a* may determine whether another device (e.g., UE 115-N) is already transmitting on the wireless channel. When the measured energy level indicates that another device is already transmitting, UE 115-*a* may refrain from transmitting. When the measured energy level indicates that the wireless channel is clear, UE 115-*a* may transmit on the wireless channel.

Additionally, UE 115-*a* may be assigned a priority category for LBT procedures. For example, UE 115-*a* may be assigned a category (e.g., category 1 (CAT1), category 2 (CAT2), category 4 (CAT4), etc.), and may monitor a medium (e.g., a wireless channel) according to the assigned category. In some cases, UE 115-*a* may be assigned CAT1 and may be allowed to transmit, for example, without observing an LBT procedure. In other cases, UE 115-*a* may be indicated a priority CAT2 and perform an LBT procedure, for example, for a single slot before transmitting. In yet other cases, UE 115-*a* may be indicated a priority CAT4 and may perform an LBT procedure, for example, for multiple slots before transmitting. UE 115-*a* may also be indicated an LBT priority associated with CAT4 to determine the behavior UE 115-*a* follows in an LBT procedure. Second message 210-*a* may accordingly indicate, within the feedback information, LBT information to UE 115-*a*. For example, base station 105-*a* may indicate, to UE 115-*a*, a priority for LBT operation. Base station 105-*a* may also indicate a category for performing LBT operation (e.g., CAT1, CAT2, CAT4), as discussed above.

In some cases, second message 210-*a* may include other information. For instance, second message 210-*a* may include a sounding reference signal (SRS) request. In such cases, base station 105-*a* may request an SRS report from UE 115-*a*, and include the request in the feedback information of the second message 210-*a*. Additionally or alternatively, second message 210-*a* may include a channel state information (CSI) request. As such, second message 210-*a* may include a request by base station 105-*a* for a CSI report from UE 115-*a*. In some cases, base station 105-*a* may indicate to UE 115-*a* (e.g., by second message 210-*a*) to send a CSI report at the same time as a feedback transmission (e.g., feedback message 215-*a*). In other cases, base station 105-*a* may indicate to UE 115-*a* to send a CSI report at a different time than a feedback transmission. In such cases, base station 105-*a* may provide additional PUCCH information to UE 115-*a* for sending the CSI report.

UE 115-*a* may decode information from second message 210-*a* and transmit feedback message 215-*a* based on the decoded payload (e.g., PUCCH information and the TA command). In some examples, UE 115-*a* may transmit an ACK on PUCCH resources according to the decoded payload from second message 210-*a* (e.g., TPC command, PUCCH resource indicator, PDSCH-to-HARQ feedback timing indicator). In some cases, UE 115-*a* may experience contention with another UE 115 (e.g., UE 115-N) attempting a RACH procedure in the same system. In such cases, UE 115-*a* may also perform contention resolution based on the decoded payload from second message 210-*a*.

In some cases, base station 105-*a* may not receive feedback message 215-*a* from a UE 115-*a*. In such cases, base station 105-*a* may retransmit second message 210-*a*. Alternatively, base station 105-*a* may determine to cease communications with UE 115-*a* until another RACH procedure is initiated by UE 115-*a*.

In some aspects, the feedback information indicated by second message 210-*a* may provide an uplink grant to UE 115-*a*. UE 115-*a* may send a corresponding uplink transmission of uplink data based on the uplink grant, where the uplink transmission may serve as feedback message 215-*a* for second message 210-*a*. As such, the receipt of the uplink data may signal to base station 105-*a* that the two-step RACH procedure was completed. In some cases, UE 115-*a* may operate using unlicensed spectrum, and UE 115-*a* may follow an LBT procedure for the transmission of the uplink data. Accordingly, the received feedback information providing the uplink grant may include LBT information (e.g., LBT priority for UE 115-*a*). UE 115-*a* may decode second message 210-*a* and may obtain the uplink grant. As mentioned above, UE 115-*a* may experience contention with another UE 115 (e.g., UE 115-N) attempting a RACH procedure in the same system. In such cases, UE 115-*a* may perform contention resolution based on the decoded second message 210-*a*.

In some cases, the uplink grant indicated in the feedback information may enable the base station 105-*a* to schedule UE 115-*a* for later uplink transmissions. Such a transmission of uplink data may enable more robust communications in wireless communications system 200. For example, UE 115-*a* may have buffered data to transmit, and may send the uplink data upon receipt of the second message 210-*a*. In some cases, although feedback message 215-*a* sent based on the uplink grant may be transmitted at a relatively later time (e.g., as compared to when transmitting feedback using the PUCCH information described herein), UE 115-*a* may transmit uplink data without waiting for a subsequent uplink grant after transmitting feedback. As a result, overall system efficiency may be enhanced.

In some cases, by transmitting the uplink grant in the feedback information of the second message 210-*a*, base station 105-*a* may avoid the possibility of failing a subsequent LBT procedure when UE 115-*a* has data to transmit (e.g., as compared to transmitting an uplink grant at a later time, such as after the RACH procedure is completed). As a result, base station 105-*a* may have a higher chance of successfully scheduling an uplink transmission for UE 115-*a*, such as when operating using unlicensed spectrum.

In some examples, second message 210-*a* may provide a downlink grant within the feedback information. UE 115-*a* may decode second message 210-*a* and may obtain the downlink grant. Here, UE 115-*a* may also resolve contention with other devices performing random access procedures based on the decoded feedback information from second message 210-*a*. In any case, base station 105-*a* may send a downlink transmission (e.g., PDSCH) corresponding to the downlink grant. UE 115-*a* may receive the downlink transmission, and may send feedback (e.g., HARQ ACK/NACK) for the downlink transmission to base station 105-*a*. This feedback corresponding to the downlink transmission may also serve as feedback (e.g., feedback message 215-*a*) for second message 210-*a*. For example, base station 105-*a* may receive feedback message 215-*a* and may determine that the RACH procedure with UE 115-*a* was successful.

Additionally, the downlink grant and the corresponding downlink transmission may be associated with a parameter (e.g., k0). The parameter k0 may indicate the size of a gap between the received downlink grant and a PDSCH time allocation. In some cases, the parameter k0 may correspond to a time period before completing RRC configuration, and the parameter k0 may be a value of 0 or a value of 1. In some cases, a gap size may be larger than the gap size indicated by the parameter k0 (e.g., when k0 is 0 or when k0 is 1). As an example, if the gap size is relatively small, UE 115-*a* may monitor for a downlink unicast transmission from base station 105-*a* until UE 115-*a* decodes second message 210-*a* for the downlink grant. In some cases, k0 may be a different value (e.g., a k0 value different than 0 or 1) when the downlink grant is included in the feedback information of second message 210-*a*, which may indicate a larger gap size. In other cases, remaining minimum system information (RMSI) may configure an additional gap in addition to a timing gap provided by the k0 value (e.g., when k0 is 0 or 1). The total gap between the received downlink grant and the PDSCH time allocation may then be the gap indicated by k0 in addition to the additional gap configured by the RMSI.

In some cases, the downlink grant may include additional information for UE 115-*a*. For example, the downlink grant may include a CSI request. In such an example, the downlink grant may include a request from base station 105-*a* for a CSI report to be sent by UE 115-*a*. In some cases, base station 105-*a* may indicate to UE 115-*a* (e.g., by the downlink grant in the feedback information) to send a CSI report at the same time as a feedback transmission (e.g., feedback message 215-*a*). In other cases, base station 105-*a* may indicate to UE 115-*a* to send a CSI report at a different time than a feedback transmission. In such cases, base station 105-*a* may provide additional PUCCH information to UE 115-*a* for transmitting the CSI report. Additionally or alternatively, the downlink grant may include LBT information (e.g., an LBT priority for UE 115-*a*). For example, UE 115-*a* may be communicating in a system using unlicensed operation. UE 115-*a* may use LBT priority information (e.g., CAT1, CAT2, CAT4) for an LBT procedure.

In some examples, wireless communications system 200 may use a combination of the signaling provided by the feedback information described herein. For example, base station 105-*a* may include a downlink grant, an uplink grant, or both, in the feedback information indicated by a second message 210. For instance, base station 105-*a* may determine to schedule additional data transmissions to UE 115-*a* and include a downlink grant in addition to an uplink grant in the feedback information indicated by second message 210-*a*. The inclusion of one or both of the uplink grant and downlink grant may be based on data to be communicated to/from UE 115-*a* and UE 115-N, and base station 105-*a* may semi-statically or dynamically determine the content of the feedback information that is provided by the second message 210.

In some examples, a system may use other combinations of the techniques described herein. For example, second message 210-*a* may provide PUCCH information and an uplink grant. In such examples, UE 115-*a* may provide feedback for the RACH procedure quickly (e.g., using PUCCH information) while maintaining an uplink grant for additional transmissions of data (e.g., using the uplink grant). In cases where UE 115-*a* may communicate using unlicensed spectrum, UE 115-*a* may perform an LBT procedure for providing feedback (e.g., a feedback transmission) using PUCCH information. UE 115-*a* may also perform an LBT procedure for an uplink data transmission using the uplink grant. The success probability of each LBT procedure may vary for each transmission. For example, a feedback transmission using PUCCH information may be associated with a different priority (e.g., a relatively high priority (e.g., CAT1)) compared to the uplink data transmission (e.g., the uplink transmission using the uplink grant may have a relatively lower priority (e.g., CAT4)). In some examples, the different priorities may be determined based on the CQI of data to be transmitted in the uplink transmission. In such cases, UE 115-*a* may successfully send the feedback for a completed RACH procedure (e.g., due to feedback transmission using PUCCH information) even if the LBT procedure fails for the uplink transmission. Such a combination of methods may reduce the chance of restarting the RACH procedure and may improve throughput in the system.

Other combinations of the signaling provided by the second message 210 are considered. For example, second message 210-*a* may provide PUCCH information and a downlink grant. In such examples, UE 115-*a* may provide feedback earlier (e.g., using PUCCH information) while maintaining a downlink grant for additional transmissions from base station 105-*a* (e.g., using the downlink grant). In some cases, base station 105-*a* may not receive UE feedback (e.g., feedback message 215-*a*) from UE 115-*a*. In such cases, base station 105-*a* may determine that UE 115-*a* failed to successfully complete the RACH procedure. As such, base station 105-*a* may determine whether to transmit downlink data associated with the downlink grant or to cease communication with UE 115-*a* based on the receipt (or not) of the feedback message 215-*a*.

In other examples, UE 115-*a* and base station 105-*a* may communicate using unlicensed operation. In such cases, UE 115-*a* may perform an LBT procedure for providing feedback (e.g., a feedback transmission) using PUCCH information. Base station 105-*a* may also perform an LBT procedure for a downlink transmission using the downlink grant. The success probability of each LBT procedure may vary for each transmission. For example, and as mentioned above, a feedback transmission using PUCCH information may have a relatively high priority (e.g., CAT1). The downlink transmission using the downlink grant may have a lower priority (e.g., CAT4). The priority may be determined based on the quality of service (QoS) class identifier (QCI) of data to be transmitted in the uplink transmission. In such examples, UE 115-*a* may successfully complete the RACH procedure (e.g., due to feedback transmission using PUCCH information) even if the LBT procedure fails for the downlink transmission. Such a combination of methods may reduce the chance of restarting the RACH procedure.

Additionally or alternatively, the feedback information within second message 210-*a* may include PUCCH information, a downlink grant, an uplink grant, or any combination thereof. For instance, base station 105-*a* may determine to schedule additional data transmissions to UE 115-*a* or may determine to request data transmission from UE 115-*a*. in such cases, base station 105-*a* may include PUCCH information and an uplink grant, or a downlink grant, or both, in second message 210.

In some examples, second message 210-*a* may include PDCCH information, an uplink grant, a downlink grant, or any combination thereof. UE 115-*a* may provide feedback for second message 210-*a* (and a confirmation that the two-step RACH procedure was completed) based on the PDCCH information, and UE 115-*a* may also use the uplink grant and/or the downlink grant for future transmissions to/from base station 105-*a*.

In some examples, the UE 115-*a* may refrain from transmitting a feedback message 215-*a*. For example, the UE 115-*a* may monitor for the second message 210-*a*. In some examples, the UE 115-*a* may fail to receive or detect the second message 210-*a*, which may result in the UE 115-*a* refraining from transmitting the feedback message 215-*a*. For example, the UE 115-*a* may be unaware of PUCCH information for the transmission of the feedback message 215-*a* and the UE 115-*a* may refrain from transmitting the feedback message 215-*a*. In some other examples, the UE 115-*a* may receive the second message 210-*a* but may be unable to successfully decode the second message 210-*a*. In such examples, the UE 115-*a* may refrain from transmitting the feedback message 215-*a*.

Figure 3:
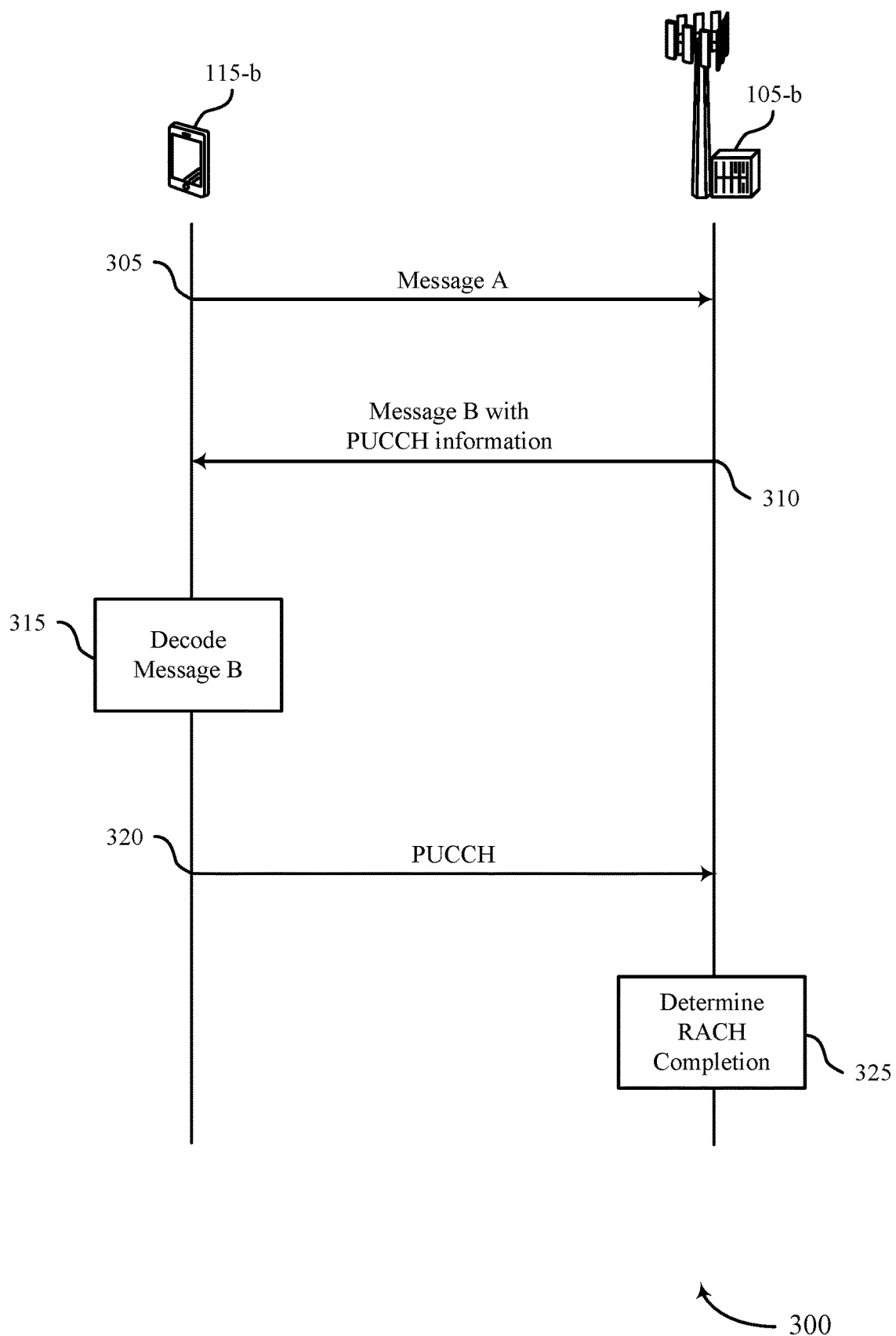
FIGS. 3 through 5 illustrate examples of process flows in a system that supports feedback for message B of a two-step RACH procedure in accordance with aspects of the present disclosure.

FIG. 3 illustrates an example of a process flow 300 that supports feedback for message B of a two-step RACH procedure in accordance with aspects of the present disclosure. In some examples, process flow 300 may implement aspects of wireless communications system 100. For example, process flow 300 includes UE 115-*b* and base station 105-*b*, which may be examples of the corresponding devices described with reference to FIG. 1. Process flow 300 may illustrate the use of PUCCH information for the transmission of feedback that confirms a RACH procedure has been completed.

At 305, UE 115-*b* may transmit, to base station 105-*b*, a first message (e.g., message A) of a two-step RACH procedure. Message A may include a RACH preamble and a PUSCH payload. Base station 105-*b* may receive message A and process the contents of the data payload to identify the random access request from UE 115-*b* and generate a response message.

At 310, base station 105-*b* may transmit, to UE 115-*b*, a second message (e.g., message B) including feedback information (e.g., PUCCH information) for signaling that the two-step RACH procedure has been completed. In some cases, message B may include a RACH preamble response and the PUCCH information. The PUCCH information may include a TPC command, or a PUCCH resource indication, or a PDSCH-to-HARQ feedback timing indicator, or a combination thereof. In some cases, the PUCCH information may include other information. For example, the PUCCH information may include LBT information, an SRS request, a CSI request, a timing advance, or any combination thereof. In other examples (such as in unlicensed spectrum operation), UE 115-*b* may receive an LBT priority via the PUCCH information, and UE 115-*b* may follow an LBT procedure accordingly. In some examples, message B may include additional feedback information on top of the PUCCH information, where the additional information may include an uplink grant, a downlink grant, or both.

At 315, UE 115-*b* may decode message B and may obtain the PUCCH information. At 320, UE 115-*b* may transmit, to base station 105-*b*, a third message (e.g., a feedback message) including an indication of whether the second message was received by UE 115-*b*. In particular, UE 115-*b* may utilize the PUCCH information for the transmission of the third message on PUCCH, where the third message serves as feedback to base station 105-*b* that the second message was received and that the two-step RACH procedure was completed. In such cases, the feedback message may include an ACK transmitted, which may be based on a timing advance command indicated by the second message (e.g., at 310).

At 325, base station 105-*b* may determine whether the third message (e.g., sent based on the PUCCH information) has been received from UE 115-*b* in accordance with the feedback information. In such cases, the third message may signal that the two-step random access channel procedure has been completed. Accordingly, if base station 105-*b* receives the third message, the base station 105-*b* may determine that UE 115-*b* received the second message and that the RACH procedure has been completed. Alternatively, if the third message is not received (e.g., after a period of time), base station 105-*b* may determine that UE 115-*b* did not receive (or was unable to successfully decode) the second message with the feedback information. In such cases, base station 105-*b* may either stop the RACH procedure or may retransmit the second message (e.g., message B) including the feedback information. The feedback information sent using the retransmission of message B may either be the same (e.g., the PUCCH information), or may be different from the feedback information sent at 310.

Figure 4:
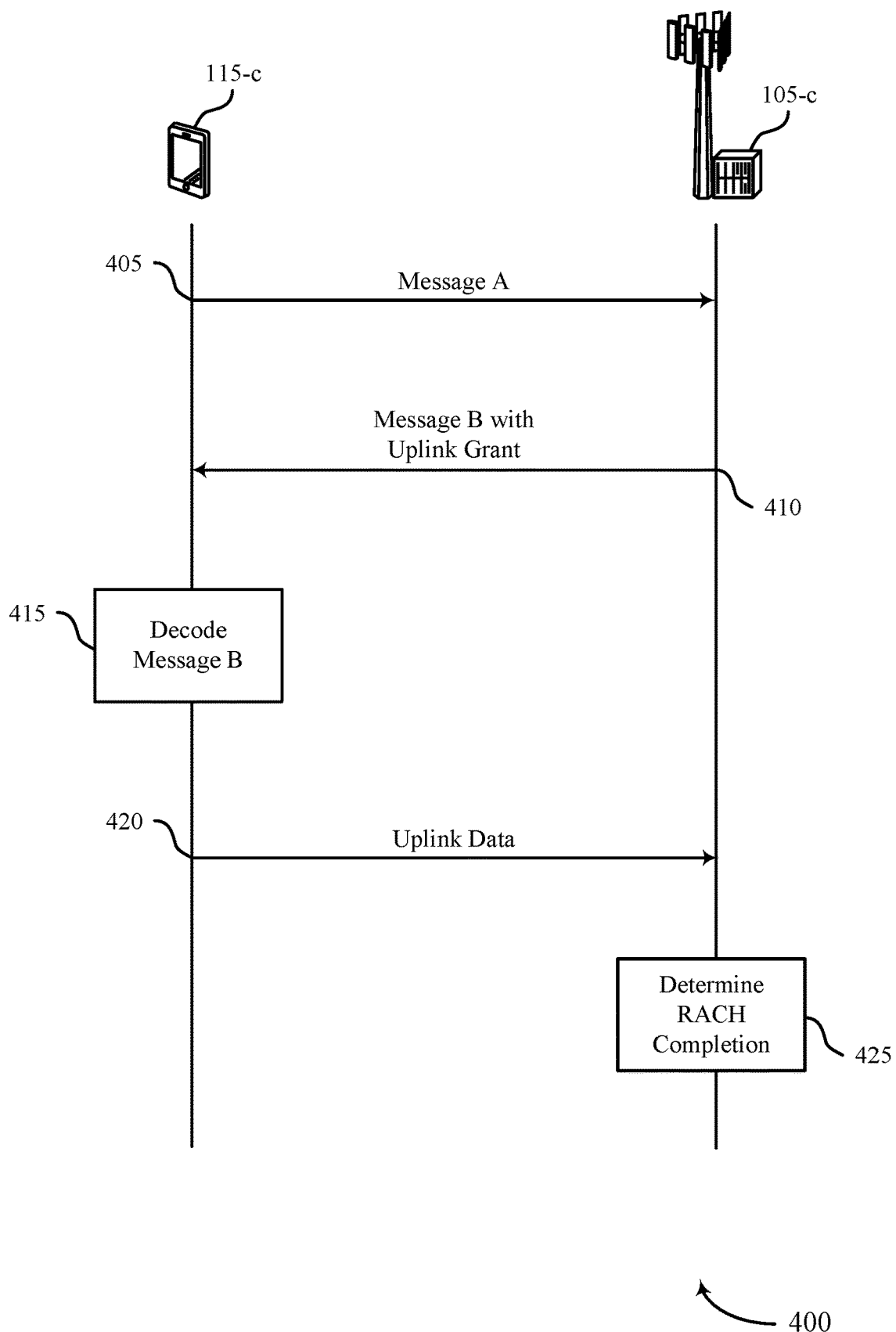

FIG. 4 illustrates an example of a process flow 400 that supports feedback for message B of a two-step RACH procedure in accordance with aspects of the present disclosure. In some examples, process flow 400 may implement aspects of wireless communications system 100. For example, process flow 400 includes UE 115-*c* and base station 105-*c*, which may be examples of the corresponding devices described with reference to FIG. 1. Process flow 400 may illustrate the use of an uplink grant for the transmission of feedback that confirms a RACH procedure has been completed.

At 405, UE 115-*c* may transmit, to base station 105-*c*, a first message (e.g., message A) of a two-step RACH procedure. Message A may include a RACH preamble and a PUSCH carrying a data payload. Base station 105-*c* may receive message A and process the contents of the data payload to generate a response message.

At 410, base station 105-*c* may transmit, to UE 115-*c*, a second message (e.g., message B) including feedback information (e.g., an uplink grant) for signaling that the two-step RACH procedure has been completed. For example, message B may include a RACH preamble response and an uplink grant. At 415, UE 115-*c* may decode message B and may obtain the uplink grant. UE 115-*c* may utilize the uplink grant to send an uplink transmission including uplink data. In some examples, the uplink grant may include LBT priority information or a medium sensing category (e.g., CAT1, CAT2, CAT4). UE 115-*c* may use the LBT information to transmit a subsequent uplink transmission. In some cases, the feedback information may include both an uplink grant and a downlink grant (e.g., based on information to be communicated between base station 105-*c* and UE 115-*c*).

At 420, UE 115-*c* may transmit, to base station 105-*c*, a third message (e.g., including uplink data) based on the uplink grant. The uplink transmission may also serve as a feedback transmission for message B. For example, the uplink data sent by UE 115-*c* may transmit uplink data, and may serve as feedback (e.g., may indicate an ACK) to message B.

At 425, base station 105-*c* may determine whether the third message (e.g., sent based on the uplink grant) has been received from UE 115-*c* in accordance with the feedback information in message B. In such cases, the third message including the uplink data may signal that the two-step random access channel procedure has been completed. Accordingly, if base station 105-*c* receives the third message, the base station 105-*c* may determine that UE 115-*c* received the second message and that the RACH procedure has been completed. Alternatively, if the third message is not received (e.g., after a period of time), base station 105-*c* may determine that UE 115-*c* did not receive (or was unable to successfully decode) the second message with the feedback information. In such cases, base station 105-*c* may either stop the RACH procedure or may retransmit the second message (e.g., message B) including the feedback information. The feedback information sent using the retransmission of message B may either be the same feedback information (e.g., the uplink grant), or may be different from the feedback information sent at 410.

Figure 5:
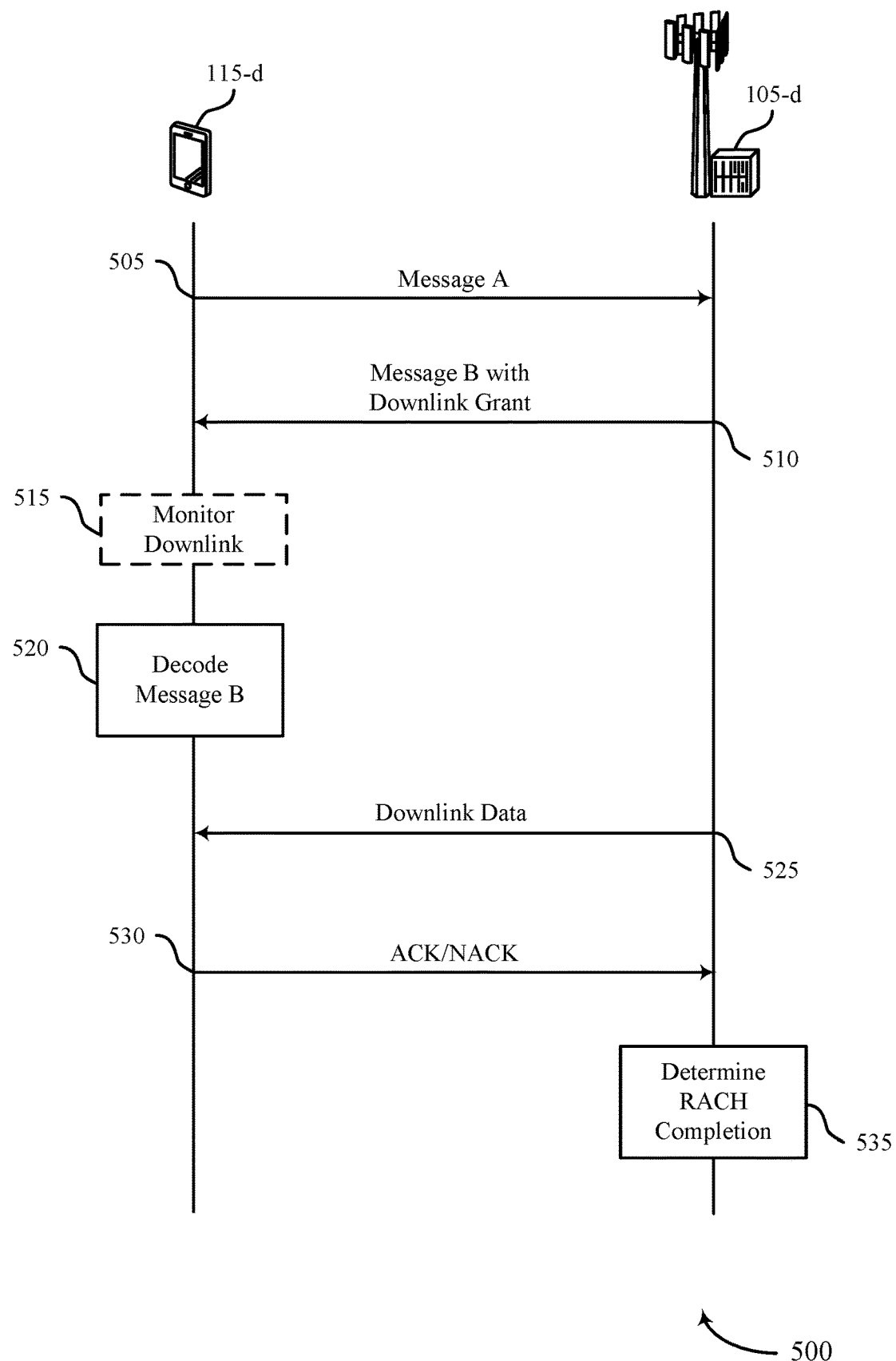

FIG. 5 illustrates an example of a process flow 500 that supports feedback for message B of a two-step RACH procedure in accordance with aspects of the present disclosure. In some examples, process flow 500 may implement aspects of wireless communications system 100. For example, process flow 500 includes UE 115-d and base station 105-d, which may be examples of the corresponding devices described with reference to FIG. 1. Process flow 500 may illustrate the use of a downlink grant and subsequent downlink transmission for the transmission of feedback that confirms a RACH procedure has been completed.

At 505, UE 115-d may transmit, to base station 105-d, a first message (e.g., message A) of a two-step RACH procedure. Message A may include a RACH preamble and a PUSCH carrying a data payload. Base station 105-d may receive message A and process the contents of the data payload to generate a response message.

At 510, base station 105-d may transmit, to UE 115-d, a second message (e.g., message B) including feedback information (e.g., a downlink grant) for signaling that the two-step RACH procedure has been completed. For example, message B may include a RACH preamble response and a downlink grant that indicates a later PDSCH transmission. Additionally or alternatively, the downlink grant may include at LBT information or a CSI request. In some cases, the feedback information may include both an uplink grant and a downlink grant (e.g., based on information to be communicated between base station 105-d and UE 115-d).

In some examples, based on the use of the downlink grant in the feedback information, at 515, UE 115-d may monitor for one or more downlink (e.g., unicast) transmissions from base station 105-d. In some cases, the monitoring may be performed until message B is decoded.

At 520, UE 115-d may decode message B and may obtain the downlink grant signaled using the feedback information. UE 115-d may utilize the downlink grant to monitor for a subsequent downlink transmission from base station 105-d. In some examples, the downlink grant included in the feedback information of message B may be associated with a timing offset between the downlink grant and the downlink data. For example, a slot offset value (e.g., parameter k0) indicating a timing offset between the downlink grant and the downlink data may be identified by UE 115-d. Message B may also be associated with a timing gap value indicating an additional timing offset between the downlink grant.

At 525, base station 105-d may transmit, to UE 115-d a downlink transmission including the downlink data based on the downlink grant. For instance, the downlink transmission may include a PDSCH payload. In some cases, the downlink data may include an RRC configuration.

At 530, UE 115-d may transmit, to base station 105-d, a third message (e.g., a feedback message) based on the downlink transmission. The feedback message may serve as a feedback transmission for both the downlink transmission and message B. For example, the feedback message may include feedback (e.g., ACK/NACK) to the downlink transmission.

At 535, base station 105-d may determine whether the third message (e.g., sent based on the downlink data) has been received from UE 115-d in accordance with the feedback information in message B. In such cases, the third message including the ACK/NACK may signal that the two-step random access channel procedure has been completed. Accordingly, if base station 105-d receives the third message, the base station 105-d may determine that UE 115-d received the second message and that the RACH procedure has been completed. Alternatively, if the third message is not received (e.g., after a period of time), base station 105-d may determine that UE 115-d did not receive (or was unable to successfully decode) the second message with the feedback information. In such cases, base station 105-d may either stop the RACH procedure or may retransmit the second message (e.g., message B) including the feedback information. The feedback information sent using the retransmission of message B may either be the same feedback information (e.g., the downlink grant), or may be different from the feedback information sent at 510.

Figure 6:
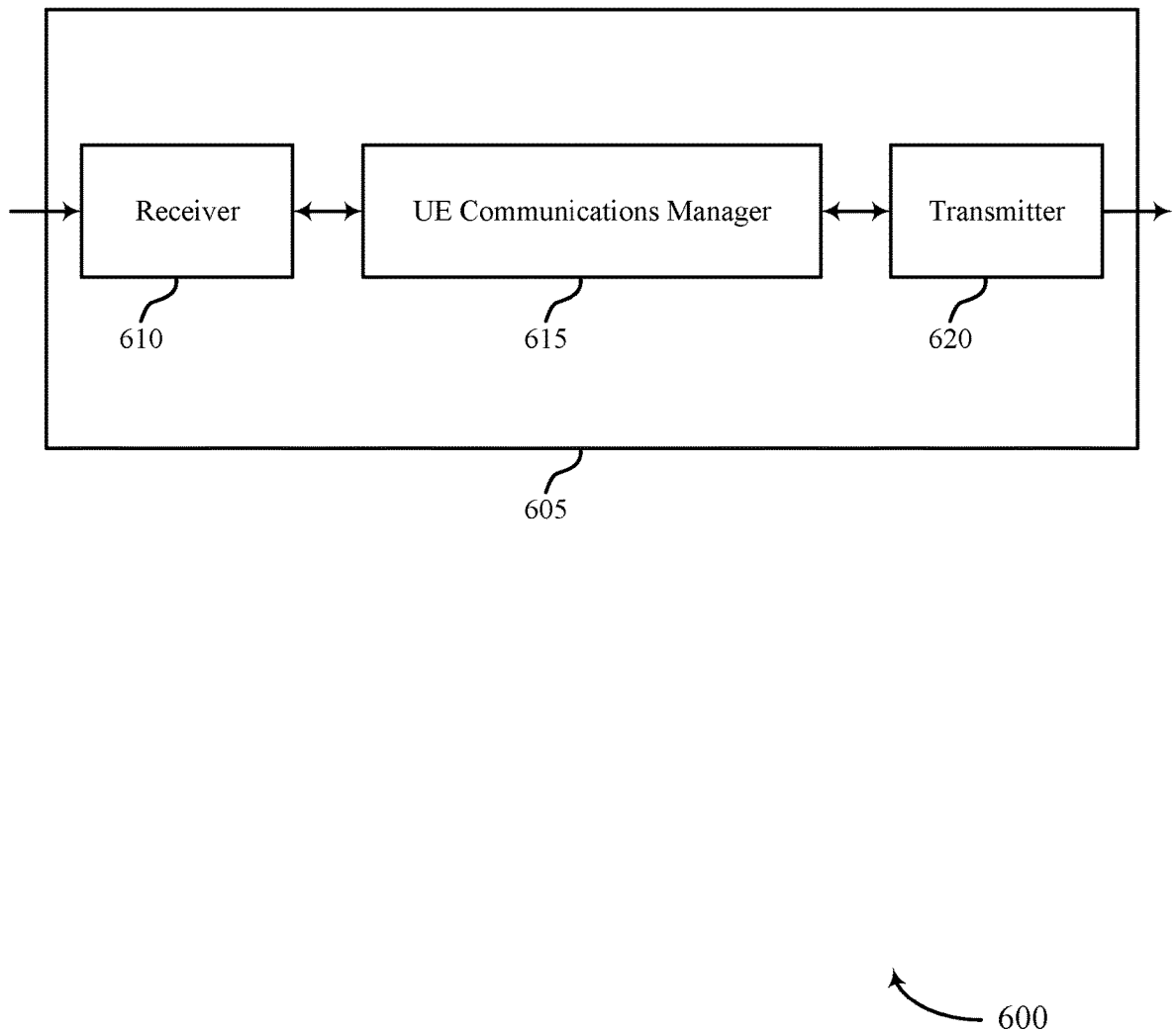
FIGS. 6 and 7 show block diagrams of devices that support feedback for message B of a two-step RACH procedure in accordance with aspects of the present disclosure.

FIG. 6 shows a block diagram 600 of a device 605 that supports feedback for message B of a two-step RACH procedure in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feedback for message B of a two-step RACH procedure, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may transmit, to a base station 105, a first message of a two-step RACH procedure, the two-step RACH procedure including the first message and a second message, receive, from the base station 105, the second message including feedback information for signaling that the two-step RACH procedure has been completed, and transmit, to the base station 105, a third message including an indication of whether the second message was received by the UE 115, the third message transmitted in accordance with the feedback information. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
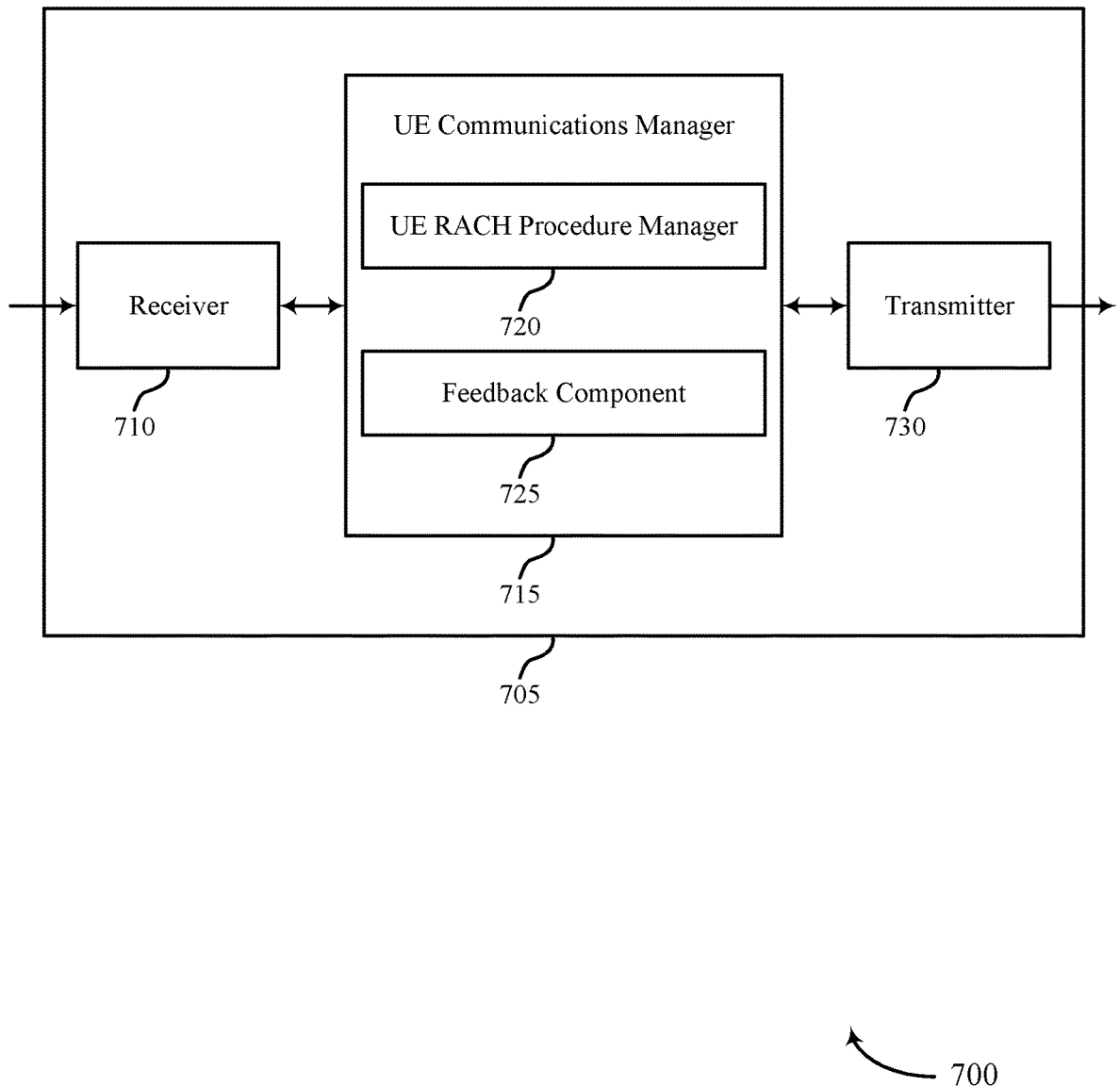

FIG. 7 shows a block diagram 700 of a device 705 that supports feedback for message B of a two-step RACH procedure in accordance with aspects of the present disclosure. The device 705 may be an example of aspects of a device 605, or a UE 115 as described herein. The device 705 may include a receiver 710, a UE communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to feedback for message B of a two-step RACH procedure, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a UE RACH procedure manager 720 and a feedback component 725. The UE communications manager 715 may be an example of aspects of the UE communications manager 910 described herein.

The UE RACH procedure manager 720 may transmit, to a base station 105, a first message of a two-step RACH procedure, the two-step RACH procedure including the first message and a second message. In some examples, the UE RACH procedure manager 720 may receive, from the base station 105, the second message including feedback information for signaling that the two-step RACH procedure has been completed.

The feedback component 725 may transmit, to the base station 105, a third message including an indication of whether the second message was received by the UE 115, the third message transmitted in accordance with the feedback information.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
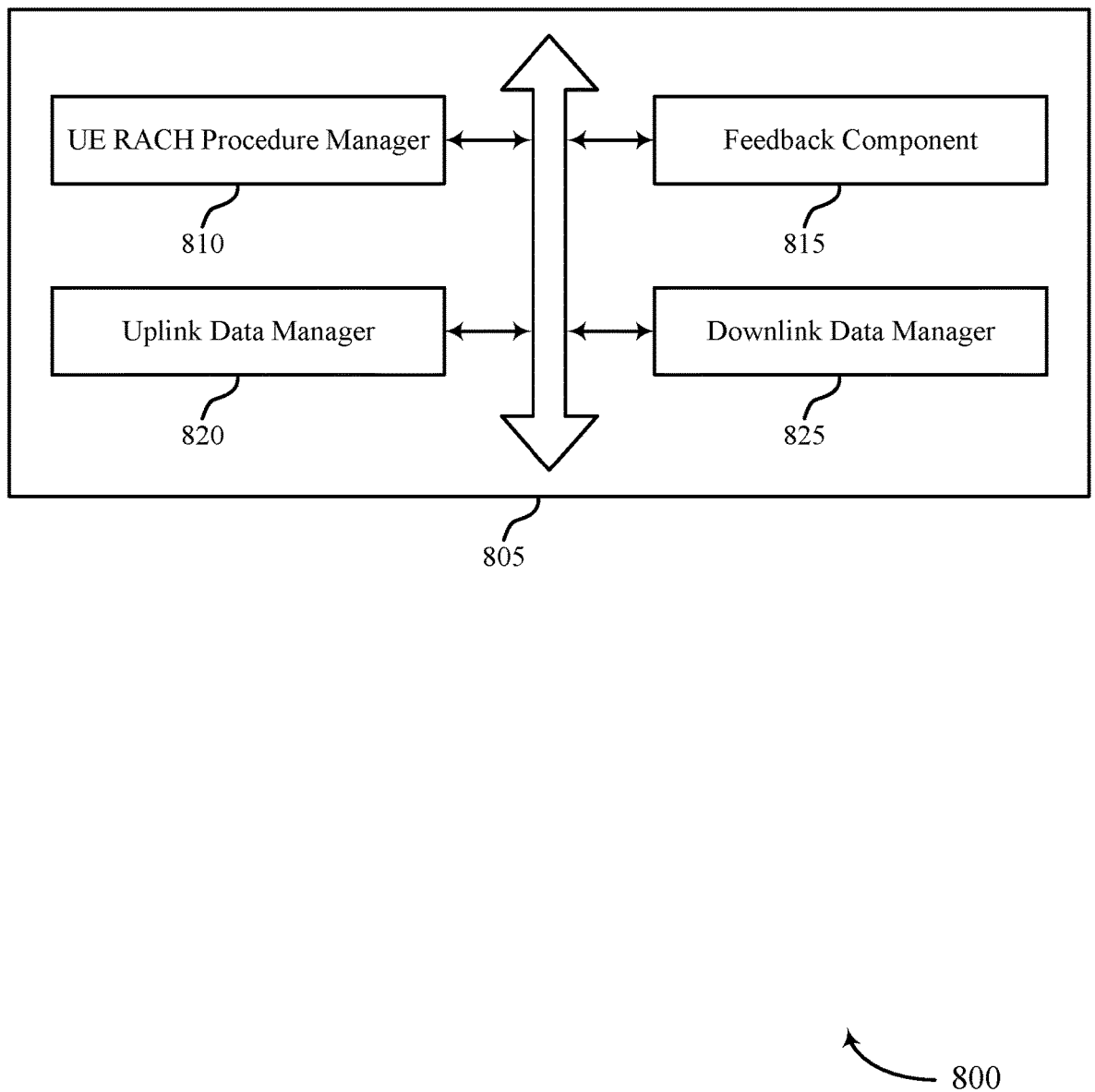
FIG. 8 shows a block diagram of a communications manager that supports feedback for message B of a two-step RACH procedure in accordance with aspects of the present disclosure.

FIG. 8 shows a block diagram 800 of a UE communications manager 805 that supports feedback for message B of a two-step RACH procedure in accordance with aspects of the present disclosure. The UE communications manager 805 may be an example of aspects of a UE communications manager 615, a UE communications manager 715, or a UE communications manager 910 described herein. The UE communications manager 805 may include a UE RACH procedure manager 810, a feedback component 815, an uplink data manager 820, and a downlink data manager 825. Each of these modules may communicate, directly or indirectly, with one another (e.g., via one or more buses).

The UE RACH procedure manager 810 may transmit, to a base station 105, a first message of a two-step RACH procedure, the two-step RACH procedure including the first message and a second message. In some examples, the UE RACH procedure manager 810 may receive, from the base station 105, the second message including feedback information for signaling that the two-step RACH procedure has been completed. In some examples, the UE RACH procedure manager 810 may receive, as part of the feedback information, information for a PUCCH. Additionally or alternatively, the UE RACH procedure manager 810 may receive, as part of the feedback information, an uplink grant for transmitting uplink data to the base station 105. In other examples, the UE RACH procedure manager 810 may receive, as part of the feedback information, a downlink grant for receiving downlink data from the base station 105.

In some examples, the UE RACH procedure manager 810 may receive, as part of the feedback information, and in addition to the PUCCH information, a downlink grant for receiving downlink data from the base station 105. In some examples, the UE RACH procedure manager 810 may receive, as part of the feedback information, and in addition to the PUCCH information, an uplink grant for transmitting uplink data to the base station 105. In some examples, the UE RACH procedure manager 810 may receive the second message via a broadcast transmission from the base station 105 or a unicast transmission from the base station 105. In some examples, the UE RACH procedure manager 810 may receive, from the base station, a downlink control message including feedback information associated with a PDCCH (e.g., a PDCCH corresponding to the second message). In some cases, the feedback information (e.g., associated with the feedback for message B of the two-step RACH procedure) may be different from the feedback information associated with the corresponding PDCCH. For instance, the feedback for the second message may be non-PDCCH-based feedback.

In some cases, the information for the PUCCH includes a TPC command. In some cases, the information may additionally or alternatively include at least one of a PUCCH resource indicator, a PDSCH-to-HARQ timing indicator, LBT information, an SRS request, or a CSI request. In some cases, the second message includes a TA command, and the third message may be transmitted based on the TA command.

In some cases, the feedback information includes at least one of an uplink grant or a downlink grant (e.g., in addition to PUCCH information) based on data to be communicated between the UE 115 and the base station 105. In some cases, the downlink grant includes at least one of LBT information or a CSI request. In some cases, the uplink grant includes LBT information including an indication of at least one of an LBT priority or a medium sensing category.

In some examples, the UE RACH procedure manager 810 may transmit, to a second base station, a fourth message of a second two-step RACH procedure, the second two-step RACH procedure including the fourth message and a fifth message. In some examples, the UE RACH procedure manager 810 may monitor for the fifth message including feedback information for signaling that the second two-step RACH procedure may have been completed. In some examples, the UE RACH procedure manager 810 may determine that the second two-step RACH procedure may be unsuccessful based on monitoring for the fifth message and refrain from transmitting a sixth message including an indication of whether the fifth message was received by the UE based on determining that the second two-step RACH procedure may be unsuccessful.

The feedback component 815 may transmit, to the base station 105, a third message including an indication of whether the second message was received by the UE 115, the third message transmitted in accordance with the feedback information. In some cases, feedback component 815 may transmit the third message on the PUCCH based at least in part on the information for the PUCCH. Additionally or alternatively, feedback component 815 may transmit the third message in response to the received downlink data, the third message including an indication of whether the downlink data was received. In some cases, feedback component 815 may transmit the third message based at least in part on the uplink grant.

In some examples, the feedback component 815 may transmit, within the third message, a CSI report based on the CSI request. In some examples, the feedback component 815 may transmit an ACK or a NACK for the downlink data, where the acknowledgment or the negative acknowledgment include the signaling that the two-step RACH procedure has been completed. The uplink data manager 820 may transmit, to the base station 105, the uplink data based on the uplink grant.

The downlink data manager 825 may receive the downlink data based on the downlink grant. In some examples, the downlink data manager 825 may receive the downlink data based on the downlink grant. In some examples, the downlink data manager 825 may monitor one or more downlink transmissions for the downlink data until the second message is decoded. In some examples, the downlink data manager 825 may determine a timing offset between the downlink grant and the downlink data, the timing offset including a timing gap value and a first slot offset value. Additionally or alternatively, the timing offset may include a second slot offset value that is greater than the first slot offset value. In some cases, the downlink data includes at least a radio resource control configuration.

Figure 9:
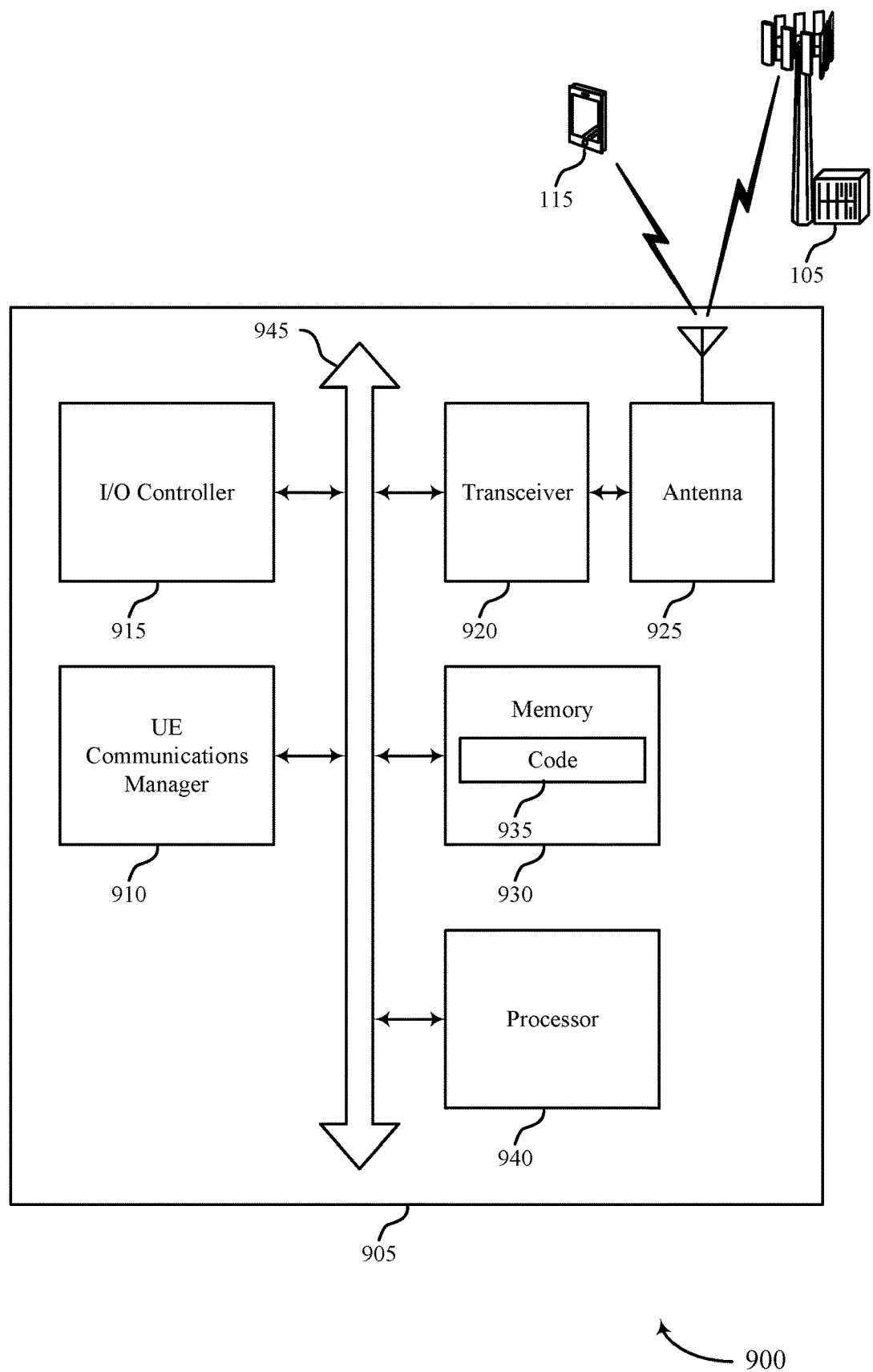
FIG. 9 shows a diagram of a system including a device that supports feedback for message B of a two-step RACH procedure in accordance with aspects of the present disclosure.

FIG. 9 shows a diagram of a system 900 including a device 905 that supports feedback for message B of a two-step RACH procedure in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may transmit, to a base station 105, a first message of a two-step RACH procedure, the two-step RACH procedure including the first message and a second message, receive, from the base station 105, the second message including feedback information for signaling that the two-step RACH procedure has been completed, and transmit, to the base station 105, a third message including an indication of whether the second message was received by the UE 115, the third message transmitted in accordance with the feedback information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback for message B of a two-step RACH procedure).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
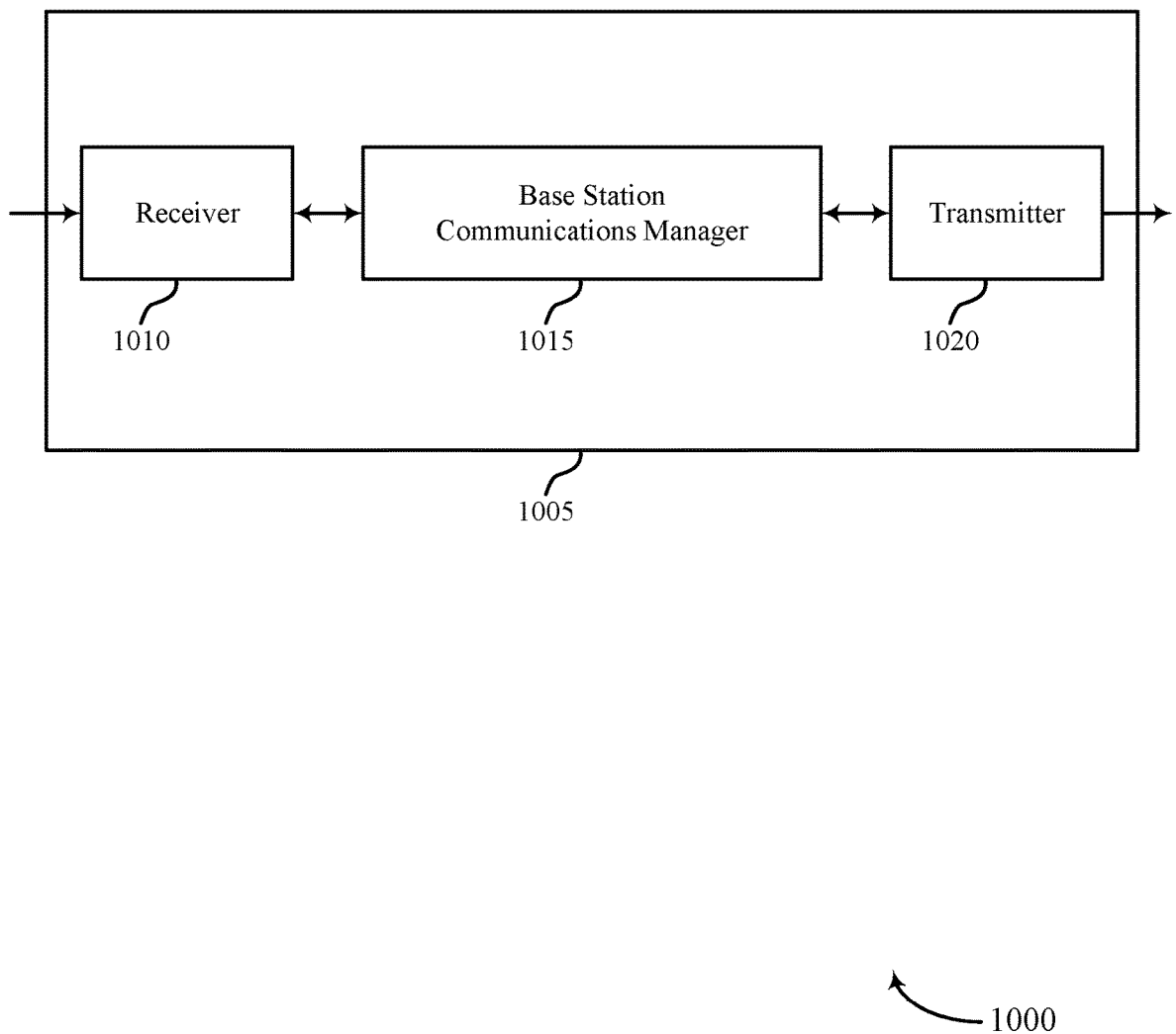
FIGS. 10 and 11 show block diagrams of devices that support feedback for message B of a two-step RACH procedure in accordance with aspects of the present disclosure.

FIG. 10 shows a block diagram 1000 of a device 1005 that supports feedback for message B of a two-step RACH procedure in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback for message B of a two-step RACH procedure, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may receive, from a UE 115, a first message of a two-step RACH procedure, the two-step RACH procedure including the first message and a second message, transmit, to the UE 115, the second message including feedback information, and determine whether a third message has been received from the UE 115 in accordance with the feedback information, where the third message signals that the two-step RACH procedure has been completed. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
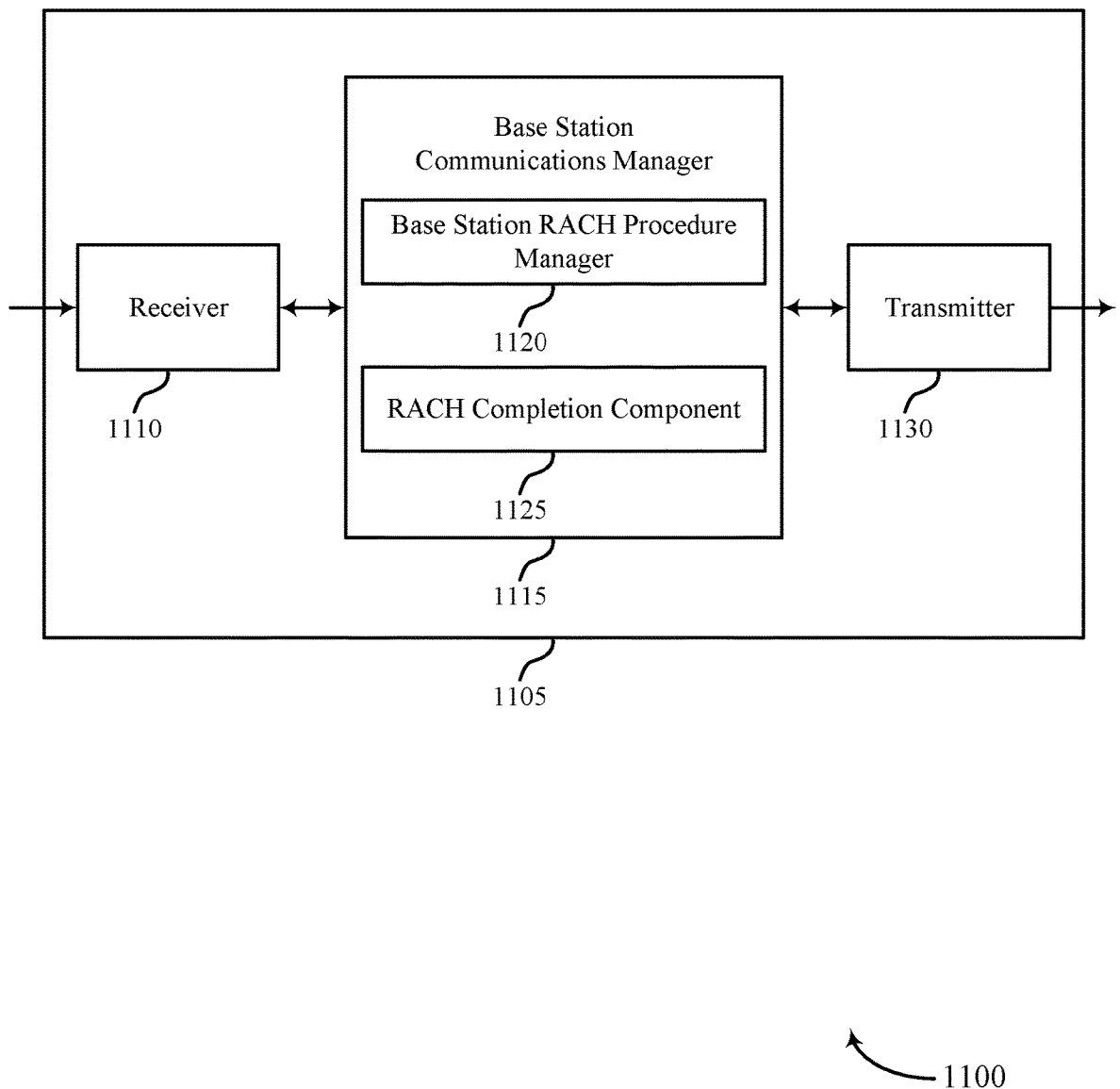

FIG. 11 shows a block diagram 1100 of a device 1105 that supports feedback for message B of a two-step RACH procedure in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback for message B of a two-step RACH procedure, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a base station RACH procedure manager 1120 and a RACH completion component 1125. The base station communications manager 1115 may be an example of aspects of the base station communications manager 1310 described herein.

The base station RACH procedure manager 1120 may receive, from a UE 115, a first message of a two-step RACH procedure, the two-step RACH procedure including the first message and a second message and transmit, to the UE 115, the second message including feedback information.

The RACH completion component 1125 may determine whether a third message has been received from the UE 115 in accordance with the feedback information, where the third message may signal that the two-step RACH procedure has been completed.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
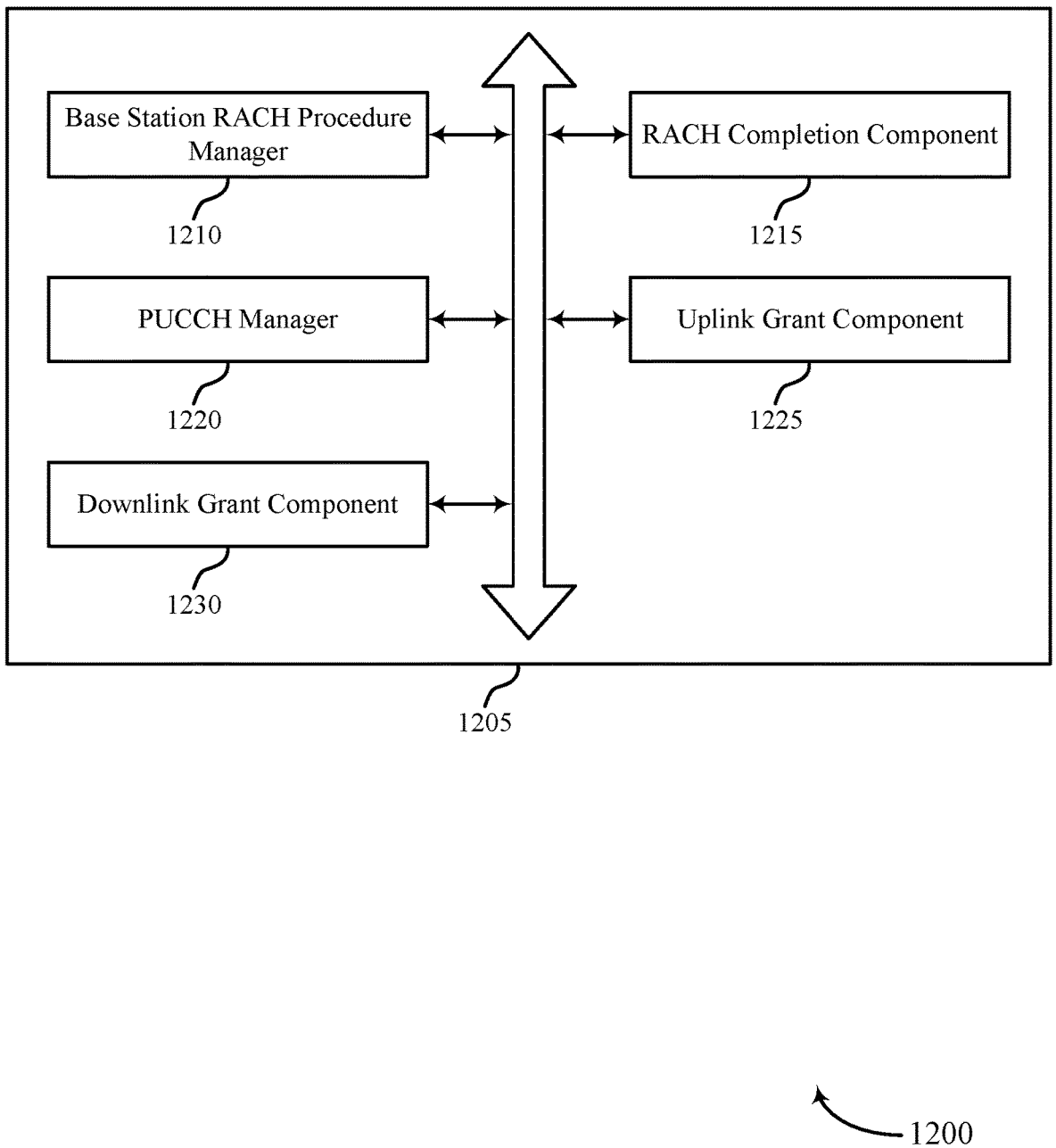
FIG. 12 shows a block diagram of a communications manager that supports feedback for message B of a two-step RACH procedure in accordance with aspects of the present disclosure.

FIG. 12 shows a block diagram 1200 of a base station communications manager 1205 that supports feedback for message B of a two-step RACH procedure in accordance with aspects of the present disclosure. The base station communications manager 1205 may be an example of aspects of a base station communications manager 1015, a base station communications manager 1115, or a base station communications manager 1310 described herein. The base station communications manager 1205 may include a base station RACH procedure manager 1210, a RACH completion component 1215, a PUCCH manager 1220, an uplink grant component 1225, and a downlink grant component 1230. Each of these modules may communicate, directly or indirectly, with one another (e.g., via one or more buses).

The base station RACH procedure manager 1210 may receive, from a UE 115, a first message of a two-step RACH procedure, the two-step RACH procedure including the first message and a second message. In some examples, the base station RACH procedure manager 1210 may transmit, to the UE 115, the second message including feedback information. In some examples, the base station RACH procedure manager 1210 may transmit, within the feedback information, information for a PUCCH. In some examples, the base station RACH procedure manager 1210 may transmit, as part of the feedback information, an uplink grant for uplink data. In some examples, the base station RACH procedure manager 1210 may transmit, as part of the feedback information, a downlink grant for transmitting downlink data.

In some examples, the base station RACH procedure manager 1210 may transmit, as part of the feedback information, an uplink grant for receiving uplink data from the UE 115. In some examples, the base station RACH procedure manager 1210 may transmit, as part of the feedback information, a downlink grant for transmitting downlink data to the UE 115. In some examples, the base station RACH procedure manager 1210 may retransmit the second message based on a determination that the third message has not been received from the UE 115. In some examples, the base station RACH procedure manager 1210 may transmit the second message via a broadcast transmission (e.g., to multiple UEs 115) or a unicast transmission to the UE 115. In some cases, the feedback information includes at least one of an uplink grant or a downlink grant based on data to be communicated between the UE 115 and the base station 105. In some examples, the feedback information may be different from the feedback information associated with the PDCCH.

The RACH completion component 1215 may determine whether a third message has been received from the UE 115 in accordance with the feedback information, where the third message signals that the two-step RACH procedure has been completed. In some examples, the RACH completion component 1215 may receive the third message on a PUCCH based on the information for the PUCCH. In some examples, the RACH completion component 1215 may receive the third message in response to the transmitted downlink data, the third message including an indication of whether the downlink data was received.

In some examples, the RACH completion component 1215 may receive an ACK or a NACK for the downlink data. In some examples, the RACH completion component 1215 may determine that the two-step RACH procedure has been completed based on the ACK or the NACK. In some examples, the RACH completion component 1215 may receive the third message based on the uplink grant. In some examples, the RACH completion component 1215 may determine that the third message has not been received from the UE 115.

The PUCCH manager 1220 may determine information for a PUCCH. In some cases, the information for the PUCCH includes a TPC command. In some cases, the information for the PUCCH additionally or alternatively includes at least one of a PUCCH resource indicator, a PDSCH-to-HARQ timing indicator, LBT information, an SRS request, or a CSI request.

The uplink grant component 1225 may identify uplink data that the UE 115 is to communicate. In some examples, the uplink grant component 1225 may receive, from the UE 115, the uplink data based on the uplink grant. In some cases, the uplink grant includes LBT information including an indication of at least one of an LBT priority or a medium sensing category.

The downlink grant component 1230 may identify downlink data for the UE 115. In some examples, the downlink grant component 1230 may transmit, to the UE 115, the downlink data based on the downlink grant. In some examples, the downlink grant component 1230 may transmit the downlink data based on the downlink grant. In some examples, the downlink grant component 1230 may transmit an indication of a timing offset between the downlink grant and the downlink data, the timing offset including a timing gap value and a first slot offset value or including a second slot offset value that is greater than the first slot offset value, where the indication of the timing offset is transmitted via remaining minimum system information. In some cases, the downlink grant includes at least one of LBT information or a CSI request. In some cases, the downlink data includes at least an RRC configuration.

Figure 13:
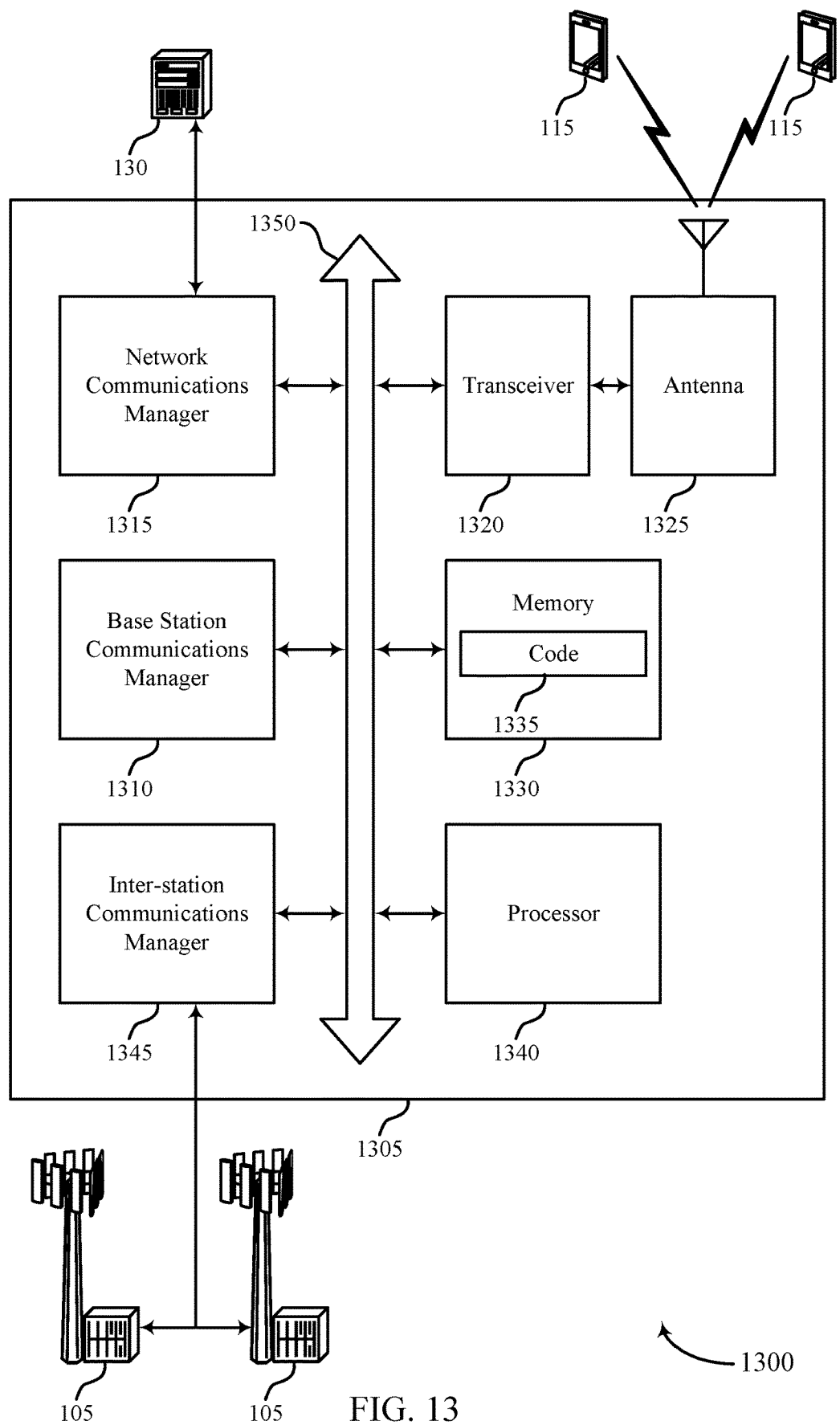
FIG. 13 shows a diagram of a system including a device that supports feedback for message B of a two-step RACH procedure in accordance with aspects of the present disclosure.

FIG. 13 shows a diagram of a system 1300 including a device 1305 that supports feedback for message B of a two-step RACH procedure in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network base station communications manager 1315, a transceiver 1320, an antenna 1325, memory 1330, a processor 1340, and an inter-station base station communications manager 1345. These components may be in electronic communication via one or more buses (e.g., bus 1350).

The base station communications manager 1310 may receive, from a UE 115, a first message of a two-step RACH procedure, the two-step RACH procedure including the first message and a second message, transmit, to the UE 115, the second message including feedback information, and determine whether a third message has been received from the UE 115 in accordance with the feedback information, where the third message signals that the two-step RACH procedure has been completed.

The network base station communications manager 1315 may manage communications with the core network (e.g., via one or more wired backhaul links). For example, the network base station communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting feedback for message B of a two-step RACH procedure).

The inter-station base station communications manager 1345 may manage communications with other base station 105, and may include a controller or scheduler for controlling communications with UEs 115 in cooperation with other base stations 105. For example, the inter-station base station communications manager 1345 may coordinate scheduling for transmissions to UEs 115 for various interference mitigation techniques such as beamforming or joint transmission. In some examples, the inter-station base station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
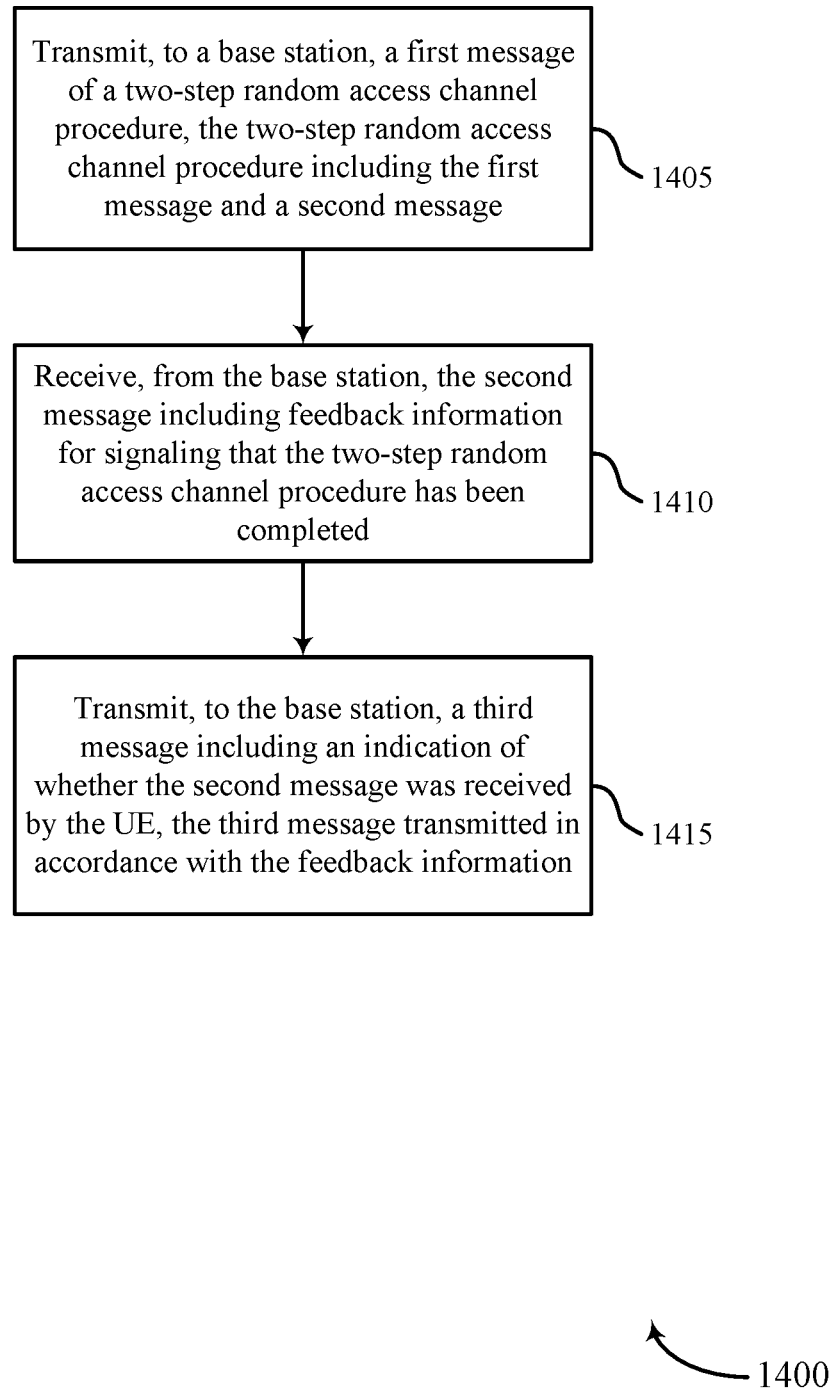
FIGS. 14 through 18 show flowcharts illustrating methods that support feedback for message B of a two-step RACH procedure in accordance with aspects of the present disclosure.

FIG. 14 shows a flowchart illustrating a method 1400 that supports feedback for message B of a two-step RACH procedure in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE 115 may transmit, to a base station 105, a first message of a two-step RACH procedure, the two-step RACH procedure including the first message and a second message. The operations of 1405 may be performed according to the methods described herein. In some examples, aspects of the operations of 1405 may be performed by a UE RACH procedure manager as described with reference to FIGS. 6 through 9.

At 1410, the UE 115 may receive, from the base station 105, the second message including feedback information for signaling that the two-step RACH procedure has been completed. The operations of 1410 may be performed according to the methods described herein. In some examples, aspects of the operations of 1410 may be performed by a UE RACH procedure manager as described with reference to FIGS. 6 through 9.

At 1415, the UE 115 may transmit, to the base station 105, a third message including an indication of whether the second message was received by the UE 115, the third message transmitted in accordance with the feedback information. The operations of 1415 may be performed according to the methods described herein. In some examples, aspects of the operations of 1415 may be performed by a feedback component as described with reference to FIGS. 6 through 9.

Figure 15:
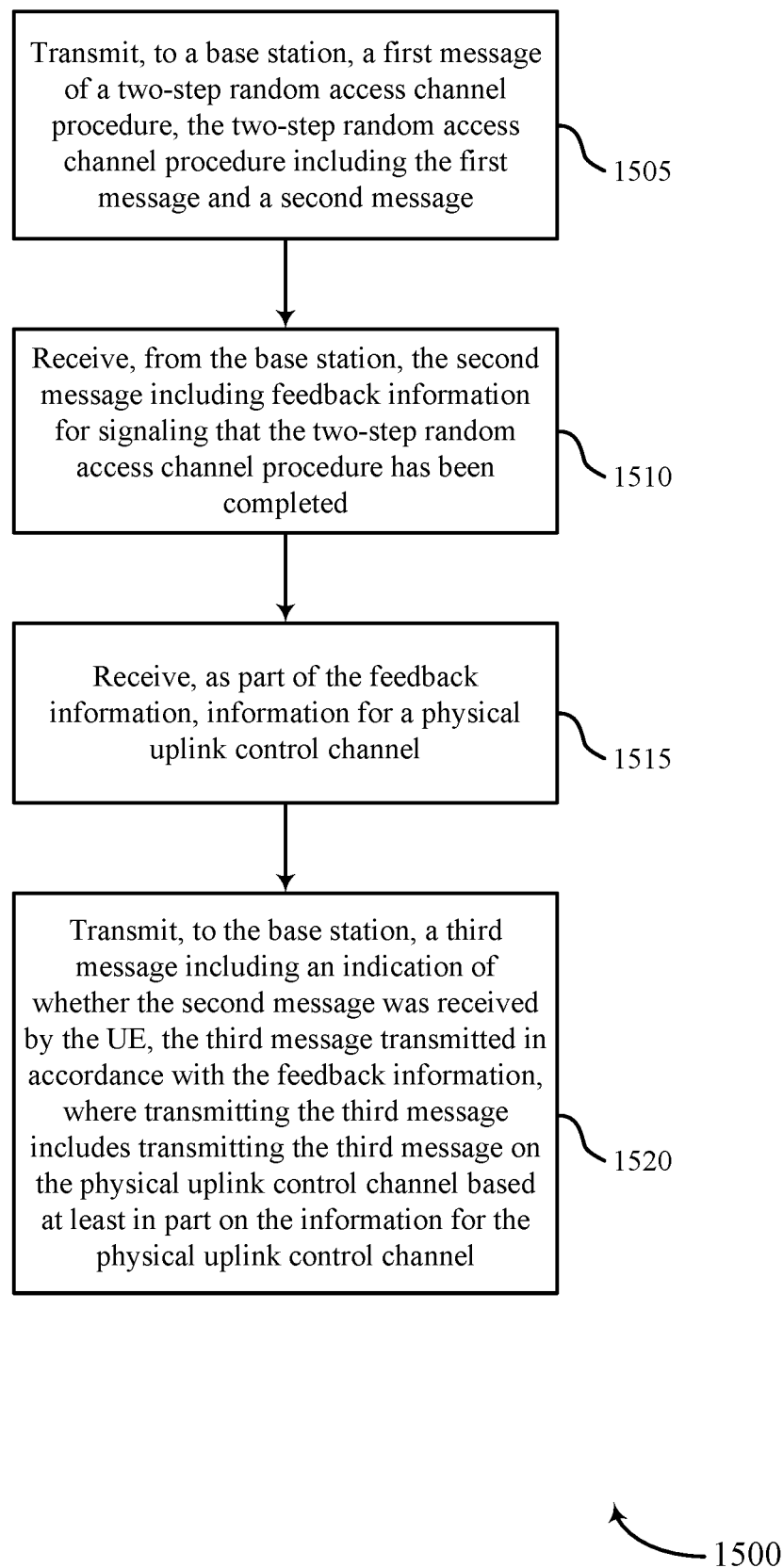

FIG. 15 shows a flowchart illustrating a method 1500 that supports feedback for message B of a two-step RACH procedure in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of instructions to control the functional elements of the UE 115 to perform the functions described below. Additionally or alternatively, a UE 115 may perform aspects of the functions described below using special-purpose hardware.

At 1505, the UE 115 may transmit, to a base station 105, a first message of a two-step RACH procedure, the two-step RACH procedure including the first message and a second message. The operations of 1505 may be performed according to the methods described herein. In some examples, aspects of the operations of 1505 may be performed by a UE RACH procedure manager as described with reference to FIGS. 6 through 9.

At 1510, the UE 115 may receive, from the base station 105, the second message including feedback information for signaling that the two-step RACH procedure has been completed. The operations of 1510 may be performed according to the methods described herein. In some examples, aspects of the operations of 1510 may be performed by a UE RACH procedure manager as described with reference to FIGS. 6 through 9.

At 1515, the UE 115 may receive, as part of the feedback information, information for a PUCCH. The operations of 1515 may be performed according to the methods described herein. In some examples, aspects of the operations of 1515 may be performed by a UE RACH procedure manager as described with reference to FIGS. 6 through 9.

At 1520, the UE 115 may transmit, to the base station 105, a third message including an indication of whether the second message was received by the UE 115, the third message transmitted in accordance with the feedback information, where transmitting the third message includes transmitting the third message on the physical uplink control channel based at least in part on the information for the physical uplink control channel. The operations of 1520 may be performed according to the methods described herein. In some examples, aspects of the operations of 1520 may be performed by a feedback component as described with reference to FIGS. 6 through 9.

Figure 16:
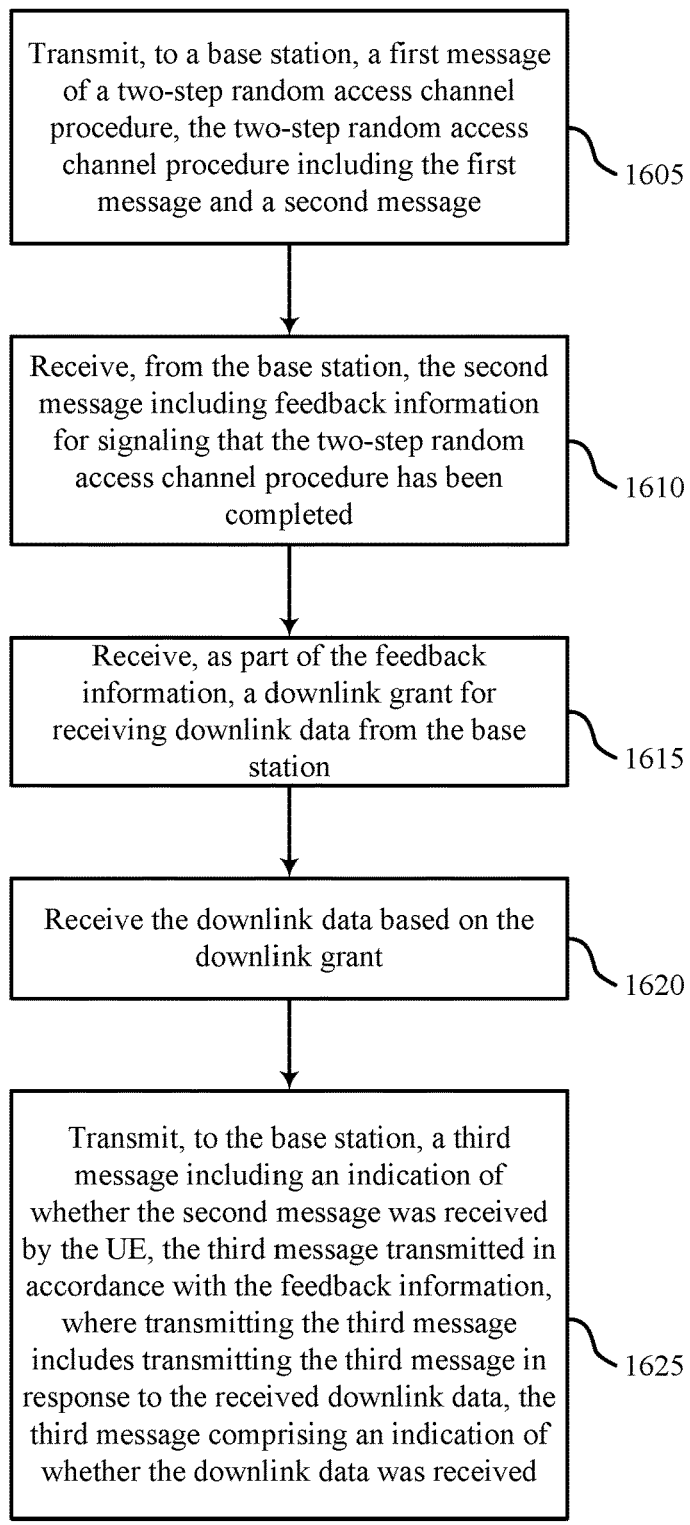

FIG. 16 shows a flowchart illustrating a method 1600 that supports feedback for message B of a two-step RACH procedure in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of instructions to control the functional elements of the UE 115 to perform the functions described below. Additionally or alternatively, a UE 115 may perform aspects of the functions described below using special-purpose hardware.

At 1605, the UE 115 may transmit, to a base station 105, a first message of a two-step RACH procedure, the two-step RACH procedure including the first message and a second message. The operations of 1605 may be performed according to the methods described herein. In some examples, aspects of the operations of 1605 may be performed by a UE RACH procedure manager as described with reference to FIGS. 6 through 9.

At 1610, the UE 115 may receive, from the base station 105, the second message including feedback information for signaling that the two-step RACH procedure has been completed. The operations of 1610 may be performed according to the methods described herein. In some examples, aspects of the operations of 1610 may be performed by a UE RACH procedure manager as described with reference to FIGS. 6 through 9.

At 1615, the UE 115 may receive, as part of the feedback information, a downlink grant for receiving downlink data from the base station 105. The operations of 1615 may be performed according to the methods described herein. In some examples, aspects of the operations of 1615 may be performed by a UE RACH procedure manager as described with reference to FIGS. 6 through 9.

At 1620, the UE 115 may receive the downlink data based on the downlink grant. The operations of 1620 may be performed according to the methods described herein. In some examples, aspects of the operations of 1620 may be performed by a downlink data manager as described with reference to FIGS. 6 through 9.

At 1625, the UE 115 may transmit, to the base station 105, a third message including an indication of whether the second message was received by the UE 115, the third message transmitted in accordance with the feedback information, where transmitting the third message includes transmitting the third message in response to the received downlink data, the third message including an indication of whether the downlink data was received. The operations of 1625 may be performed according to the methods described herein. In some examples, aspects of the operations of 1625 may be performed by a feedback component as described with reference to FIGS. 6 through 9.

Figure 17:
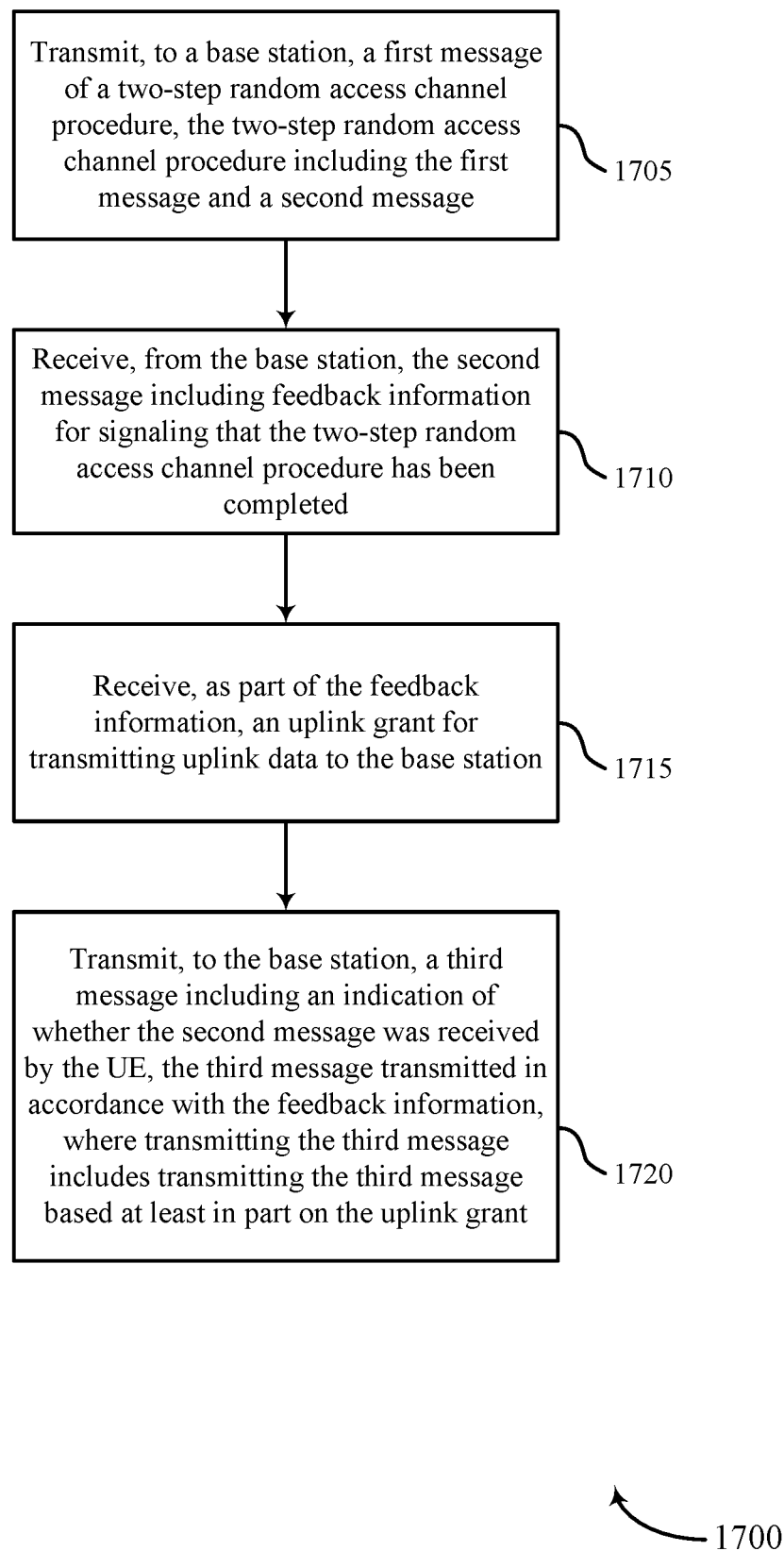

FIG. 17 shows a flowchart illustrating a method 1700 that supports feedback for message B of a two-step RACH procedure in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of instructions to control the functional elements of the UE 115 to perform the functions described below. Additionally or alternatively, a UE 115 may perform aspects of the functions described below using special-purpose hardware.

At 1705, the UE 115 may transmit, to a base station 105, a first message of a two-step RACH procedure, the two-step RACH procedure including the first message and a second message. The operations of 1705 may be performed according to the methods described herein. In some examples, aspects of the operations of 1705 may be performed by a UE RACH procedure manager as described with reference to FIGS. 6 through 9.

At 1710, the UE 115 may receive, from the base station 105, the second message including feedback information for signaling that the two-step RACH procedure has been completed. The operations of 1710 may be performed according to the methods described herein. In some examples, aspects of the operations of 1710 may be performed by a UE RACH procedure manager as described with reference to FIGS. 6 through 9.

At 1715, the UE 115 may receive, as part of the feedback information, an uplink grant for transmitting uplink data to the base station 105. The operations of 1715 may be performed according to the methods described herein. In some examples, aspects of the operations of 1715 may be performed by a UE RACH procedure manager as described with reference to FIGS. 6 through 9.

At 1720, the UE 115 may transmit, to the base station 105, a third message including an indication of whether the second message was received by the UE 115, the third message transmitted in accordance with the feedback information, where transmitting the third message includes transmitting the third message based at least in part on the uplink grant. The operations of 1720 may be performed according to the methods described herein. In some examples, aspects of the operations of 1720 may be performed by a feedback component as described with reference to FIGS. 6 through 9.

Figure 18:
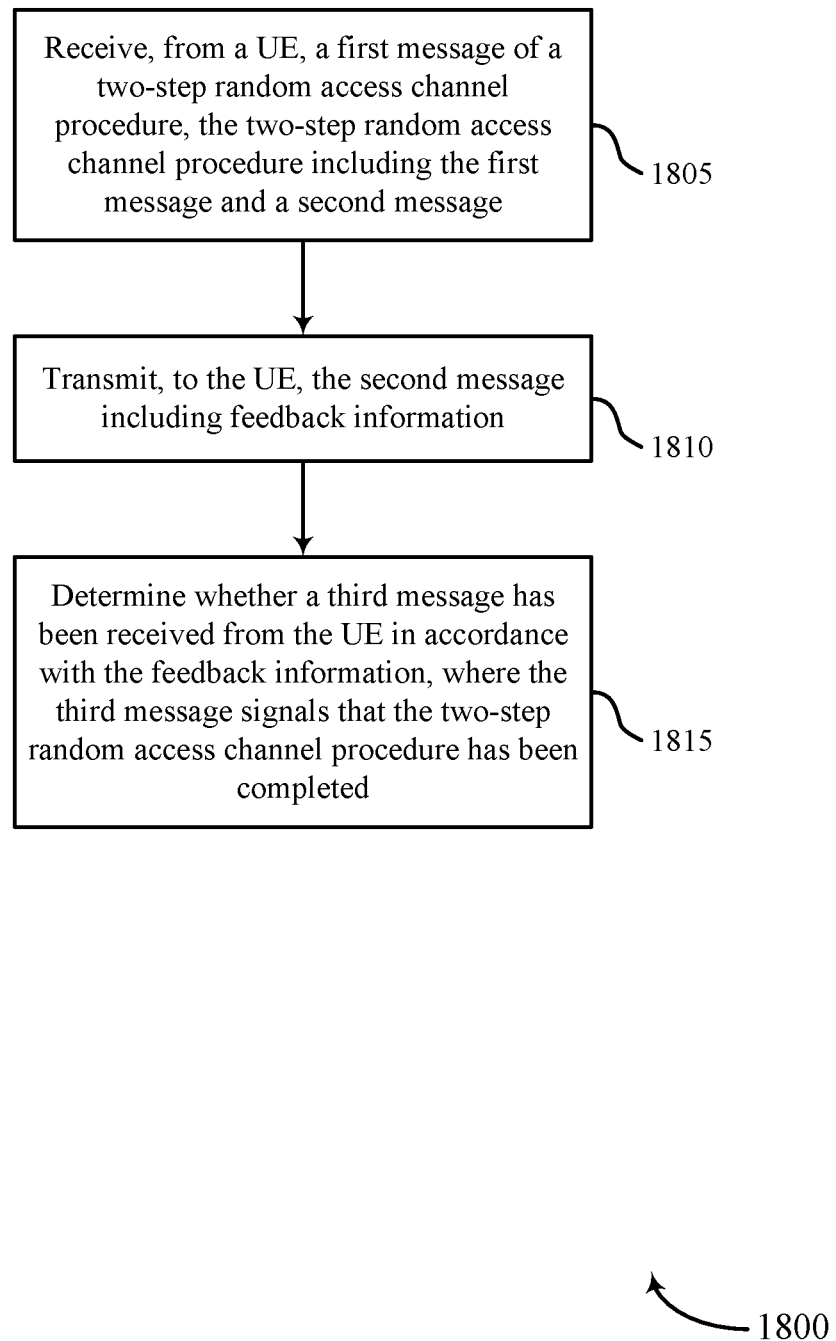

FIG. 18 shows a flowchart illustrating a method 1800 that supports feedback for message B of a two-step RACH procedure in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE 115, a first message of a two-step RACH procedure, the two-step RACH procedure including the first message and a second message. The operations of 1805 may be performed according to the methods described herein. In some examples, aspects of the operations of 1805 may be performed by a base station RACH procedure manager as described with reference to FIGS. 10 through 13.

At 1810, the base station may transmit, to the UE 115, the second message including feedback information. The operations of 1810 may be performed according to the methods described herein. In some examples, aspects of the operations of 1810 may be performed by a base station RACH procedure manager as described with reference to FIGS. 10 through 13.

At 1815, the base station may determine whether a third message has been received from the UE 115 in accordance with the feedback information, where the third message signals that the two-step RACH procedure has been completed. The operations of 1815 may be performed according to the methods described herein. In some examples, aspects of the operations of 1815 may be performed by a RACH completion component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        transmit, to a network device, a first message of a two-step random access channel procedure, the two-step random access channel procedure comprising the first message and a second message;
        receive, from the network device, the second message indicating information for transmitting one or more messages, wherein the information comprises a physical uplink control channel resource indicator, a hybrid automatic repeat request feedback timing indicator, and a transmit power control command; and
        transmit a third message to the network device, the third message being transmitted based at least in part on the information indicated by the second message.

2. The apparatus of claim 1, wherein the instructions are further executable by the processor to cause the apparatus to:
    receive, as part of the information, physical uplink control channel information, wherein the third message comprises hybrid automatic repeat request feedback information and is transmitted on a physical uplink control channel based at least in part on the physical uplink control channel information.

3. The apparatus of claim 1, wherein:
    the second message comprises a timing advance command; and
    the third message is transmitted based at least in part on the timing advance command.

4. The apparatus of claim 1, wherein the instructions are further executable by the processor to cause the apparatus to:
    receive, as part of the information, an uplink grant for transmitting uplink data to the network device; and
    transmit the uplink data to the network device, the uplink data being transmitted based at least in part on the uplink grant.

5. The apparatus of claim 1, wherein the information comprises an uplink grant, a timing advance command, a temporary cell radio network temporary identifier, or any combination thereof.

6. The apparatus of claim 1, wherein the instructions are further executable by the processor to cause the apparatus to:
    transmit, to a second network device, a fourth message of a second two-step random access channel procedure, the second two-step random access channel procedure comprising the fourth message and a fifth message; and
    refrain from transmitting a sixth message to the second network device based at least in part on the second two-step random access channel procedure being unsuccessful, the sixth message indicating whether the fifth message of the second two-step random access channel procedure was successfully decoded.

7. The apparatus of claim 6, wherein the instructions are further executable by the processor to cause the apparatus to:
    receive the fifth message; and
    fail to decode the fifth message, wherein the second two-step random access channel procedure is unsuccessful based at least in part on failing to decode the fifth message.

8. The apparatus of claim 6, wherein the instructions are further executable by the processor to cause the apparatus to:
    fail to receive the fifth message, wherein the second two-step random access channel procedure is unsuccessful based at least in part on failing to receive the fifth message.

9. A method for wireless communication at a user equipment (UE), comprising:
    transmitting, to a network device, a first message of a two-step random access channel procedure, the two-step random access channel procedure comprising the first message and a second message;
    receiving, from the network device, the second message indicating information for transmitting one or more messages, wherein the information comprises a physical uplink control channel resource indicator, a hybrid automatic repeat request feedback timing indicator, and a transmit power control command; and
    transmitting a third message to the network device, the third message being transmitted based at least in part on the information indicated by the second message.

10. The method of claim 9, further comprising:
    receiving, as part of the information, an uplink grant for transmitting uplink data to the network device; and
    transmitting the uplink data to the network device, the uplink data being transmitted based at least in part on the uplink grant.

11. The method of claim 9, wherein the information comprises an uplink grant, a timing advance command, a temporary cell radio network temporary identifier, or any combination thereof.

12. The method of claim 9, further comprising:
    receiving, as part of the information, physical uplink control channel information, wherein the third message comprises hybrid automatic repeat request feedback information and is transmitted on a physical uplink control channel based at least in part on the physical uplink control channel information.

13. The method of claim 9, wherein:
    the second message comprises a timing advance command; and
    the third message is transmitted based at least in part on the timing advance command.

14. The method of claim 9, further comprising:
    transmitting, to a second network device, a fourth message of a second two-step random access channel procedure, the second two-step random access channel procedure comprising the fourth message and a fifth message; and
    refraining from transmitting a sixth message to the second network device based at least in part on the second two-step random access channel procedure being unsuccessful, the sixth message indicating whether the fifth message of the second two-step random access channel procedure was successfully decoded.

15. The method of claim 14, wherein the second two-step random access channel procedure is unsuccessful based at least in part on failing to decode the fifth message or failing to receive the fifth message.

16. An apparatus for wireless communication at a network device, comprising:
- a processor;
- memory coupled with the processor; and
- instructions stored in the memory and executable by the processor to cause the apparatus to:
  - receive, from a user equipment (UE), a first message of a two-step random access channel procedure, the two-step random access channel procedure comprising the first message and a second message;
  - transmit the second message indicating information for transmitting one or more messages, wherein the information comprises a physical uplink control channel resource indicator, a hybrid automatic repeat request feedback timing indicator, and a transmit power control command; and
  - receive a third message based at least in part on the information.

17. The apparatus of claim 16, wherein the instructions are further executable by the processor to cause the apparatus to:
- transmit, as part of the information, an uplink grant for transmitting uplink data; and
- receive the uplink data based at least in part on the uplink grant.

18. The apparatus of claim 16, wherein the information comprises an uplink grant, a timing advance command, a temporary cell radio network temporary identifier, or any combination thereof.

19. The apparatus of claim 16, wherein the instructions are further executable by the processor to cause the apparatus to:
- transmit, within the information, physical uplink control channel information, wherein the third message comprises hybrid automatic repeat request feedback information and is transmitted on a physical uplink control channel based at least in part on the physical uplink control channel information.

20. The apparatus of claim 16, wherein:
- the second message comprises a timing advance command; and
- the third message is transmitted based at least in part on the timing advance command.

* * * * *